US011722183B2

United States Patent
Cao

(10) Patent No.: US 11,722,183 B2
(45) Date of Patent: Aug. 8, 2023

(54) ELECTRONIC DEVICE, COMMUNICATION METHOD AND STORAGE MEDIUM

(71) Applicant: Sony Corporation, Tokyo (JP)

(72) Inventor: Jianfei Cao, Beijing (CN)

(73) Assignee: SONY CORPORATION, Tokyo (JP)

( * ) Notice: Subject to any disclaimer, the term of this patent is extended or adjusted under 35 U.S.C. 154(b) by 95 days.

(21) Appl. No.: 17/269,539

(22) PCT Filed: Sep. 23, 2019

(86) PCT No.: PCT/CN2019/107275
§ 371 (c)(1),
(2) Date: Feb. 19, 2021

(87) PCT Pub. No.: WO2020/063532
PCT Pub. Date: Apr. 2, 2020

(65) Prior Publication Data
US 2021/0184733 A1     Jun. 17, 2021

(30) Foreign Application Priority Data

Sep. 27, 2018 (CN) .......................... 201811127677.6

(51) Int. Cl.
*H04B 7/0408* (2017.01)
*H04W 76/27* (2018.01)
(Continued)

(52) U.S. Cl.
CPC ......... *H04B 7/0408* (2013.01); *H04B 7/0608* (2013.01); *H04W 72/046* (2013.01);
(Continued)

(58) Field of Classification Search
CPC .... H04B 7/0408; H04B 7/0608; H04B 7/063; H04B 7/0639; H04B 7/0695; H04B 7/088;
(Continued)

(56) References Cited

U.S. PATENT DOCUMENTS

2016/0006122 A1   1/2016  Seol et al.
2018/0199258 A1*  7/2018  Cezanne ............... H04W 72/51
(Continued)

FOREIGN PATENT DOCUMENTS

CN    107734514 A    2/2018
CN    107896123 A    4/2018
(Continued)

OTHER PUBLICATIONS

International Search Report and Written Opinion dated Dec. 19, 2019, received for PCT Application PCT/CN2019/107275, Filed on Sep. 23, 2019, 8 pages including English Translation.

*Primary Examiner* — Shailendra Kumar
(74) *Attorney, Agent, or Firm* — Xsensus LLP

(57) ABSTRACT

The present disclosure relates to electronic device, communication method and storage medium in a wireless communication system. There is provided an electronic device on side of control device, comprising a processing circuitry configured to: select one or more transmitting beams to be used for downlink transmission with a user equipment based on beam information reported by the user equipment; and control to indicate the one or more transmitting beams to the user equipment, wherein, the processing circuitry is configured to perform the selecting of transmitting beams according to a beam reporting mode of the user equipment, and to select a plurality of transmitting beams in case where the user equipment reports the beam information in a group-based beam reporting mode.

14 Claims, 20 Drawing Sheets

(51) Int. Cl.
*H04B 7/06* (2006.01)
*H04W 72/044* (2023.01)
*H04W 80/02* (2009.01)
*H04W 72/23* (2023.01)
*H04W 72/53* (2023.01)

(52) U.S. Cl.
CPC ........... *H04W 72/23* (2023.01); *H04W 72/53* (2023.01); *H04W 76/27* (2018.02); *H04W 80/02* (2013.01)

(58) Field of Classification Search
CPC .. H04B 7/0413; H04B 7/0602; H04B 7/0802; H04W 72/042; H04W 72/046; H04W 72/0493; H04W 76/27; H04W 80/02; H04W 16/28
See application file for complete search history.

(56) References Cited

U.S. PATENT DOCUMENTS

| | | | | |
|---|---|---|---|---|
| 2019/0141693 | A1* | 5/2019 | Guo | H04W 16/14 |
| 2019/0190669 | A1* | 6/2019 | Park | H04L 5/0094 |
| 2020/0077369 | A1* | 3/2020 | Zhang | H04W 72/0446 |
| 2022/0061080 | A1* | 2/2022 | Takeda | H04L 5/0044 |

FOREIGN PATENT DOCUMENTS

| | | | | |
|---|---|---|---|---|
| CN | 108023629 A | | 5/2018 | |
| WO | WO-2018059005 A1 * | | 4/2018 | H04B 7/04 |

* cited by examiner

| Field | Bit width |
|---|---|
| CRI | $\lceil \log_2(K_s^{CSI-RS}) \rceil$ |
| SSBRI | $\lceil \log_2(K_s^{SSB}) \rceil$ |
| RSRP | 7 |
| Differential RSRP | 4 |

| CSI report No. | CSI field |
|---|---|
| CSI report #n | MultiBeamTxAvailable |
| | CRI or SSBRI #1 |
| | CRI or SSBRI #2 |
| | CRI or SSBRI #3 |
| | CRI or SSBRI #Nr |
| | RSRP #1 |
| | Differential RSRP #2 |
| | Differential RSRP #3 |
| | Differential RSRP #Nr |

FIG.8A

| CSI report No. | CSI field |
|---|---|
| CSI report #n | Mark1 |
| | CRI or SSBRI #1 |
| | Mark2 |
| | CRI or SSBRI #2 |
| | Mark3 |
| | CRI or SSBRI #3 |
| | MarkNr |
| | CRI or SSBRI #Nr (if reported) |
| | RSRP #1 (if reported) |
| | Differential RSRP #2 (if reported) |
| | Differential RSRP #3 (if reported) |
| | Differential RSRP #Nr (if reported) |

FIG.8B

| CSI report No. | CSI field |
|---|---|
| | CRI or SSBRI #1 (if reported) |
| | CRI or SSBRI #2 (if reported) |
| | Subset3 |
| | CRI or SSBRI #3 (if reported) |
| | CRI or SSBRI #4 (if reported) |
| | RSRP #1 (if reported) |
| | Differential RSRP #2 (if reported) |
| | Differential RSRP #3 (if reported) |
| | Differential RSRP #4 (if reported) |

1st PDDCH transmission:

2nd PDCCH transmission:

Maxnr-th PDCCH transmission:

| R | Serving cell ID | | | BWP ID | | | | Oct 1 |
|---|---|---|---|---|---|---|---|---|
| $T_7$ | $T_6$ | $T_5$ | $T_4$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |
| $T_{(N-2) \times 0 - 7}$ | $T_{(N-2) \times 8 + 6}$ | $T_{(N-2) \times 8 + 5}$ | $T_{(N-2) \times 8 + 4}$ | $T_{(N-2) \times 8 + 3}$ | $T_{(N-2) \times 8 + 2}$ | $T_{(N-2) \times 8 + 1}$ | $T_{(N-2) \times 8}$ | Oct N |

| Index | TCI state |
|---|---|
| 0 | TCI state ID 0 |
| 1 | TCI state ID 1 |
| 2 | TCI state ID 2 |
| 3 | TCI state ID 3 |
| 4 | TCI state ID 0,1 |
| ... | TCI state ID 0,2 |
| | TCI state ID 0,3 |
| | TCI state ID 1,2 |
| | TCI state ID 1,3 |
| | TCI state ID 2,3 |
| | TCI state ID 0,1,2 |
| | TCI state ID 0,1,3 |
| | TCI state ID 0,2,3 |
| | ... |
| X | TCI state ID 0,1,2,3 |

# ELECTRONIC DEVICE, COMMUNICATION METHOD AND STORAGE MEDIUM

CROSS REFERENCES TO RELATED APPLICATIONS

This application is based on PCT filing PCT/CN2019/107275, filed Sep. 23, 2019, which claims the priority of Chinese Patent Application No. 201811127677.6, filed Sep. 27, 2018, the entirety of each is incorporated herein by reference.

FIELD OF THE INVENTION

The present disclosure relates to an electronic device, a communication method and a storage medium, and more specifically, the present disclosure relates to an electronic device, a communication method and a storage medium for multi-beam operation in a wireless communication system.

RELATED ART

With the coming of the 5G era, there is a significant increase in the number of users and the rate requirement per user, and the need for further expansion in spatial domain has become more urgent. Large-scale antenna technology has attracted much attention because of its huge potential in improving spectrum efficiency of system and user experience on rate. Currently, Massive MIMO (Massive MIMO) technology has become one of key technologies for the 5G communication.

In the massive MIMO system, base station and user equipment (UE) have a number of antennas supporting the MIMO technology. Base station antennas and UE antennas can form spatial beams with narrow directivity by beamforming to provide a strong power coverage in a specific direction, thereby combating the large path loss in high-frequency channels. In order to improve the quality of beam reception, the beam direction needs to match the channel direction, that is, on the transmitting side, the transmitting beam is aligned with Angle of Departure (AOD) of the channel, and on the receiving side, the receiving beam is aligned with Angle of Arrival (AOA) of the channel. The base station and the user equipment determine the transmitting beam and the receiving beam to be used through beam training.

For example, in 4G Long Term Evolution (LTE) standard and the first standard R15 of 5G New Radio (NR), only single-beam operation is supported. Specifically, the base station selects only a single transmitting beam for transmission of channels such as physical downlink shared channel (PDSCH) and physical downlink control channel (PDCCH) through beam training, and the UE on the receiving side also uses only the corresponding single receiving beam for reception. However, inventors of the present disclosure have recognized that the single-beam operation has shortcomings. For example, in a high-frequency bandwidth, the transmission path of the single beam may have a higher possibility of being blocked, and may not be able to guarantee spatial diversity to obtain corresponding diversity gain, moreover, the single-beam operation has a lower SINR level.

Therefore, there is a need to further expand the capability of beam operation of a wireless communication system to improve its transmission performance.

SUMMARY OF THE INVENTION

The present disclosure provides various aspects, so that a wireless communication systems can support a multi-beam operation in addition to the single-beam operation. By applying one or more aspects of the present disclosure, the above-mentioned need is met.

A brief overview of the present disclosure is given below in order to provide a basic understanding of some aspects of the present disclosure. However, it should be understood that this summary is not an exhaustive summary of the present disclosure. It is not intended to determine the key or important part of the present disclosure, nor is intended to limit the scope of the present disclosure. Its purpose is only to present some concepts about the present disclosure in a simplified form and to serve as a prelude to the more detailed description given later.

According one aspect of the present disclosure, there is provided an electronic device on side of control device, comprising: a processing circuitry configured to: select one or more transmitting beams to be used for downlink transmission with a user equipment based on beam information reported by the user equipment; and control to indicate the one or more transmitting beams to the user equipment, wherein the processing circuitry is configured to perform the selecting of transmitting beams according to a beam reporting mode of the user equipment, and to select a plurality of transmitting beams in case where the user equipment reports the beam information in a group-based beam reporting mode.

According one aspect of the present disclosure, there is provided an electronic device on side of control device, comprising: a processing circuitry configured to: select a plurality of transmitting beams to be used for downlink transmission with a user equipment from a set of transmitting beams based on beam information reported by the user equipment; and control to indicate the plurality of transmitting beams to the user equipment, wherein for the user equipment, the plurality of transmitting beams are mutually compatible in transmitting and receiving.

According one aspect of the present disclosure, there is provided an electronic device on side of user equipment comprising: a processing circuitry configured to: report beam information to a control device in a group-based beam reporting mode; receive identification information on a plurality of beams from the control device; and receive the plurality of beams transmitted by the control device by using the identification information.

According one aspect of the present disclosure, there is provided an electronic device on side of user equipment comprising: a processing circuitry configured to report beam information and compatibility information of a set of beams to a control device; receive identification information on a plurality of beams from the control device, wherein for the user equipment, the plurality of beams are mutually compatible in transmitting and receiving; and receive the plurality of beams transmitted by the control device by using the identification information.

According one aspect of the present disclosure, there is provided a communication method, comprising: selecting one or more transmitting beams to be used for downlink transmission with a user equipment based on beam information reported by the user equipment; and controlling to indicate the one or more transmitting beams to the user equipment, wherein the processing circuitry is configured to perform the selecting of transmitting beams according to a beam reporting mode of the user equipment, and to select a plurality of transmitting beams in case where the user equipment reports the beam information in a group-based beam reporting mode.

According one aspect of the present disclosure, there is provided a communication method, comprising: selecting a plurality of transmitting beams to be used for downlink transmission with a user equipment from a set of transmitting beams based on beam information reported by the user equipment; and controlling to indicate the plurality of transmitting beams to the user equipment, wherein for the user equipment, the plurality of transmitting beams are mutually compatible in transmitting and receiving.

According one aspect of the present disclosure, there is provided a communication method, comprising: reporting beam information to a control device in a group-based beam reporting mode; receiving identification information on a plurality of beams from the control device; and receiving the plurality of beams transmitted by the control device by using the identification information.

According one aspect of the present disclosure, there is provided a communication method, comprising: reporting beam information and compatibility information of a set of beams to a control device; receiving identification information on a plurality of beams from the control device, wherein for the user equipment, the plurality of beams are mutually compatible in transmitting and receiving; and receiving the plurality of beams transmitted by the control device by using the identification information.

According one aspect of the present disclosure, there is provided a non-transitory computer readable storage medium storing executable instructions which, when executed, implement any of the above communication methods.

The embodiments of the present disclosure provide strategies for implementing multi-beam operation and signaling support to extend the MIMO capability of a wireless communication system from single-beam operation to multi-beam operation, thereby improving the transmission performance.

BRIEF DESCRIPTION OF THE DRAWINGS

A better understanding of the present disclosure may be achieved by referring to a detailed description given hereinafter in connection with accompanying figures, where the same or similar reference signs are used to indicate the same or similar components throughout the drawings. All drawings are included in the specification and form a part of the specification along with the following detailed description, for further illustrating embodiments of the present disclosure and for explaining the principle and advantages of the present disclosure. Wherein.

FIGS. 8A-8C show examples of including receiving compatibility information in a beam report;

FIG. 9 illustrates a configuration of a TCI state;

Features and aspects of the present disclosure will become apparent from the following description of exemplary embodiments with reference to the attached drawings.

DESCRIPTION OF EMBODIMENTS

Various illustrative embodiments of the present disclosure will be described hereinafter with reference to the drawings. For purpose of clarity and simplicity, not all features of the embodiments are described in the specification. Note that, however, many settings specific to the implementations can be made in practicing the present disclosure according to specific requirements, so as to achieve specific goals of the developers, for example, to comply with the limitations related to apparatus and service, and these limitations may vary from one implementation to another. Furthermore, it will be appreciated that despite complex and tedious, the development work is a routine task for those skilled in the art who benefit from the present disclosure.

In addition, note that in order to avoid obscuring the present disclosure due to unnecessary details, the figures illustrate only steps of a process and/or components of a device that are closely related to the technical solution of the present disclosure, and omit other details that are in little relation to the present disclosure. The following description of illustrative embodiments are merely exemplary and should not be regarded as any limitation on the scope of the present disclosure and the applications thereof.

To facilitate the explanation of technical solutions of the present disclosure, various aspects of the present disclosure will be described below in the context of 5G NR. However, it should be noted that this is not a limitation on the scope of application of the present disclosure. One or more aspects of the present disclosure can also be applied to wireless communication systems such as 4G LTE/LTE-A that have been commonly used, or various wireless communication systems to be developed in future. The architecture, entities, functions, processes and the like mentioned in the following description are not limited to those in the NR communication system, but can be found in other communication standards.

[Overview of System]

Figure 1:
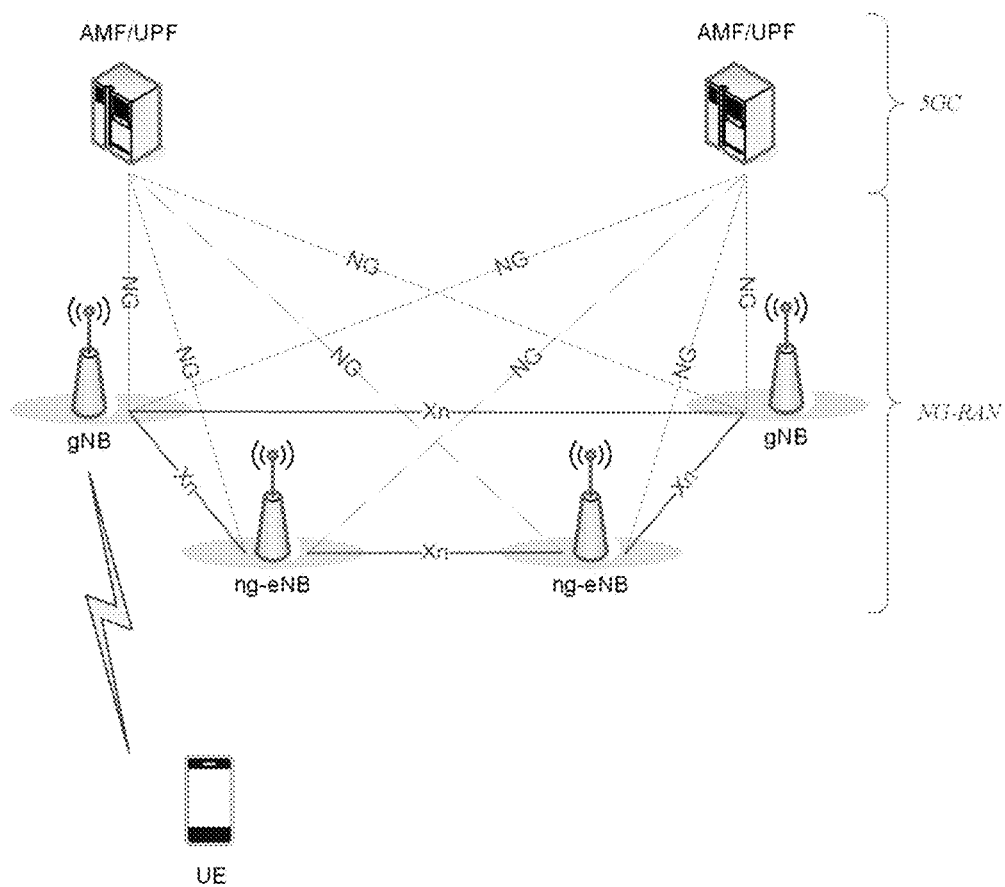
FIG. 1 is a simplified diagram showing architecture of the NR communication system.

FIG. 1 is a simplified diagram showing architecture of the NR communication system. As shown in FIG. 1, on the network side, the radio access network (NG-RAN) nodes of the NR communication system include gNB and ng-eNB, wherein gNB is a newly defined node in the 5G NR communication standard, and it is connected to 5G core network (5GC) via NG interface, and provides the NR protocols of user plane and control plane that terminate with terminal equipment (also referred to as "user equipment", hereinafter referred to as "UE"); and ng-eNB is a node defined to compatible with 4G LTE communication system, and it can be an evolved Node B (eNB) of LTE radio access network, connects the equipment to the 5G core network via the NG interface, and provides an evolved universal terrestrial radio access (E-UTRA) protocols of user plane and control plane that terminate with the UE. Hereinafter, gNB and ng-eNB are collectively referred to as "base station".

However, it should be noted that the term "base station" used in the present disclosure is not limited to the above two types of nodes, but serves as an example of a control device on the network side and has the full breadth of its usual meaning. For example, in addition to the gNB and ng-eNB provided in the 5G communication standard, depending on the scenario to which the technical solution of the present disclosure is applied, the "base station" may also be, for example, an eNB in LTE communication system, a remote radio head, a wireless access point, a drone control tower, a control node in an automated factory, or a communication apparatus that perform similar functions. The following chapter will describe application examples of the base station in detail.

In addition, in the present disclosure, the term "UE" has the full breadth of its usual meaning, including various terminal devices or in-vehicle devices that communicate with a base station. As an example, the UE may be a terminal device such as a mobile phone, a laptop, a tablet, an in-vehicle communication device, a drone, a sensor and an actuator in an automated factory, or an element thereof. The following chapter will describe application examples of the UE in detail.

Figure 2A:
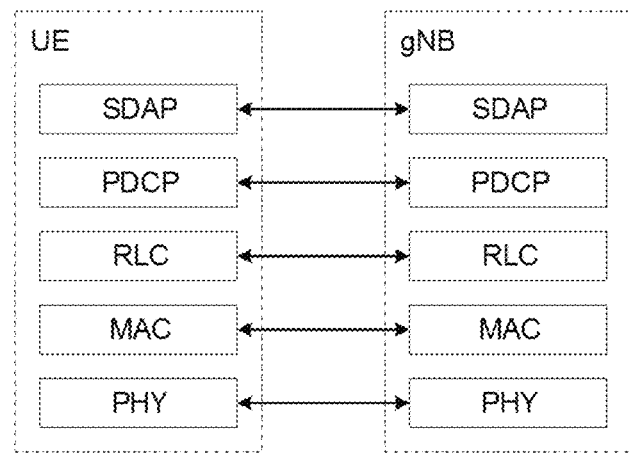
FIGS. 2A and 2B are NR radio protocol architecture on user plane and on control plane, respectively.
Figure 2B:
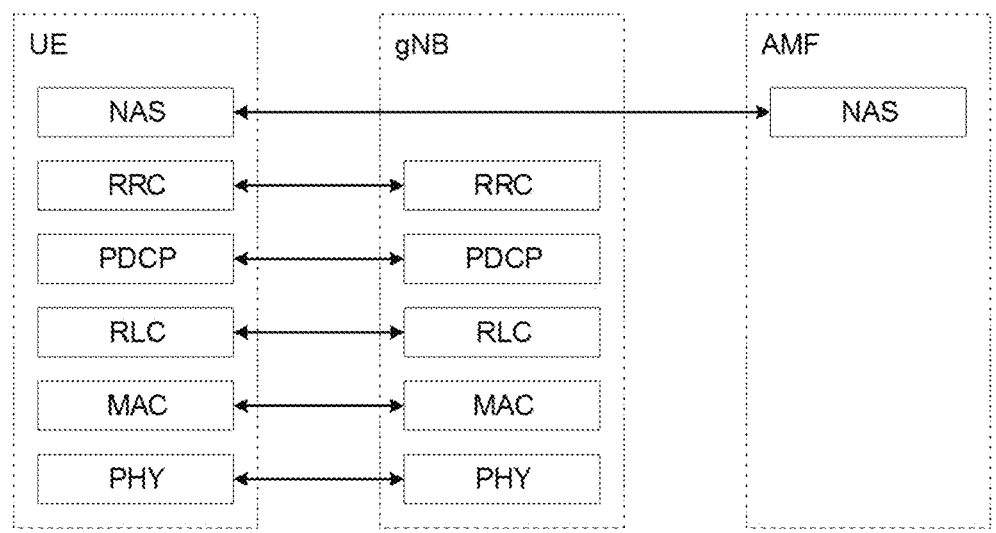

Next, the NR radio protocol architecture for the base station and the UE in FIG. 1 will be explained with reference to FIGS. 2A and 2B. FIG. 2A shows a radio protocol stack of user plane for the UE and gNB, and FIG. 2B shows a radio protocol stack of control plane for the UE and gNB. The radio protocol stack is shown as having three layers: layer 1, layer 2, and layer 3.

Layer 1 (L1) is the lowest layer and implements various physical-layer signal processing to provide transparent transmission functions for signals. The L1 will be referred to as physical layer (PHY) herein.

Layer 2 (L2 layer) is above the physical layer and is responsible for a link above the physical layer between the UE and the base station. In the user plane and the control plane, the L2 layer includes a medium access control (MAC) sublayer, a radio link control (RLC) sublayer, and a packet data convergence protocol (PDCP) sublayer, which terminate at the base station on the network side (Ng-eNB, gNB) and terminate at the UE on the user side.

Among them, the MAC sublayer provides functions such as mapping between logical channels and transport channels, multiplexing and demultiplexing of MAC service data units (SDU), scheduling information reporting, error correction through HARQ, priority processing between UEs, and priority processing between logical channels of a single UE. The MAC sublayer is responsible for allocating various radio resources (for example, resource blocks) in a cell among UEs. The RLC sublayer provides functions such as segmenting and reassembling of upper-layer data packets, retransmission of lost data packets, and reordering of data packets. The PDCP sublayer provides multiplexing between different radio bearers and logical channels. The PDCP sublayer also provides functions such as sequence numbering, header compression and decompression, transmission of user data and control plane data, rearrangement and duplicate detection. In addition, the PDCP sublayer also provides different functions for the user plane and the control plane.

In the user plane, the service data adaptation protocol (SDAP) sublayer is also included in the UE and the base station. The SDAP sublayer provides functions such as mapping between QoS flows and data radio bearers, and marking QoS flow ID (QFI) in upstream and downstream packets.

In the control plane, radio resource control (RRC) sublayer in layer 3 (L3 layer) is also included in the UE and the base station. The RRC sublayer is responsible for obtaining radio resources (i.e., radio bearers) and for configuring lower layers using RRC signaling between the base station and the UE. In addition, the non-access stratum (NAS) control protocol in the UE performs functions such as authentication, mobility management, and security control.

Various signal processing functions at L1 (i.e., the physical layer) implemented on the base station side will be briefly introduced. These signal processing functions include coding and interleaving to facilitate forward error correction (FEC) by the UE and mapping to signal constellations based on various modulation schemes (for example, binary phase shift keying (BPSK), quadrature phase shift keying (QPSK), M phase shift Keying (M-PSK), M-quadrature amplitude modulation (M-QAM)). Subsequently, the coded and modulated symbols are split into parallel streams. Each of the streams is then used with a reference signal to generate a physical channel that carries a time-domain symbol stream. The symbol stream is spatially pre-coded to generate multiple spatial streams. Channel estimation can be used to determine a coding and modulation scheme and for spatial processing. The channel estimation may be derived from the reference signal and/or channel condition feedback transmitted by the UE. Each of the spatial streams is then provided to a different antenna via a separate transmitter. Each transmitter modulates the RF carrier with its own spatial stream for transmission.

At the UE, each receiver receives the signal through its respective antennas. Each receiver recovers information modulated on the radio frequency (RF) carrier and provides this information to various signal processing functions at L1. Spatial processings are performed on the information at L1 to recover any spatial stream destined for the UE. If there are multiple spatial streams destined for the UE, they can be combined into a single symbol stream. This symbol stream is then converted from the time domain to the frequency domain. Each symbol and reference signal are recovered and demodulated by determining the signal constellation point most likely to be transmitted by the base station. These soft decisions can be based on channel estimation. These soft decisions are then decoded and de-interleaved to recover the data and control signal originally transmitted by the base station on the physical channel. These data and control signal are then provided to higher-level processing.

In order to support application of the MIMO technology, both of the base station and the UE have many antennas, such as dozens, hundreds or even thousands of antennas. For the antenna model, a three-layer mapping relationship is generally defined around the antenna, so that it can successfully undertake the channel model and communication standards.

The bottom layer is the most basic physical unit—antenna (also called antenna element). Each of antenna elements radiates electromagnetic waves according to respective amplitude parameter and phase parameter.

Figure 3A:
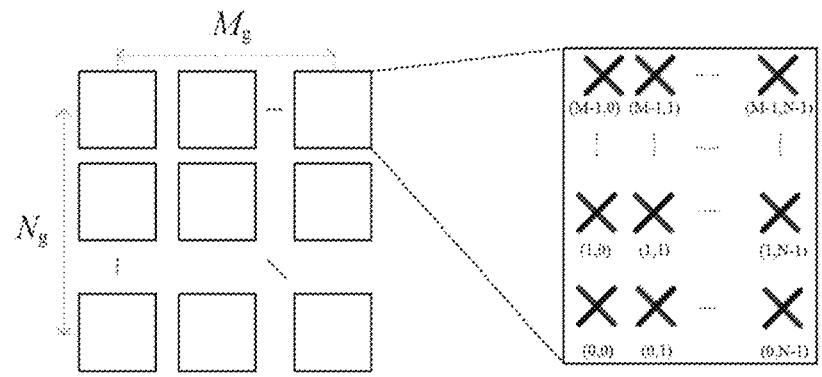
FIG. 3A shows an example of an antenna array arranged in a matrix.

The antenna elements are arranged in one or more antenna arrays in form of a matrix. An antenna array can be composed of an entire row, an entire column, multiple rows, and multiple columns of antenna array elements. At this layer, each antenna array actually constitutes a Transceiver Unit (TXRU). Each TXRU can be configured independently. By configuring amplitude parameters and/or phase parameters of the antenna elements that make up the TXRU, the TXRU antenna pattern can be adjusted. The electromagnetic wave radiation emitted by all antenna elements in the antenna array forms a narrow beam pointing to a specific spatial direction, that is, beamforming is realized. Physically, an antenna panel may include at least one antenna array. FIG. 3A shows an example of antenna arrays arranged in a matrix, where $M_g$ and $N_g$ represent numbers of antenna arrays in the horizontal direction and the vertical direction, respectively. The base station and the UE may include one, two or more antenna panels. Generally speaking, a base station can include more antennas (for example, even 1024 antennas) than a UE, thereby having a stronger beamforming capability.

Figure 3B:
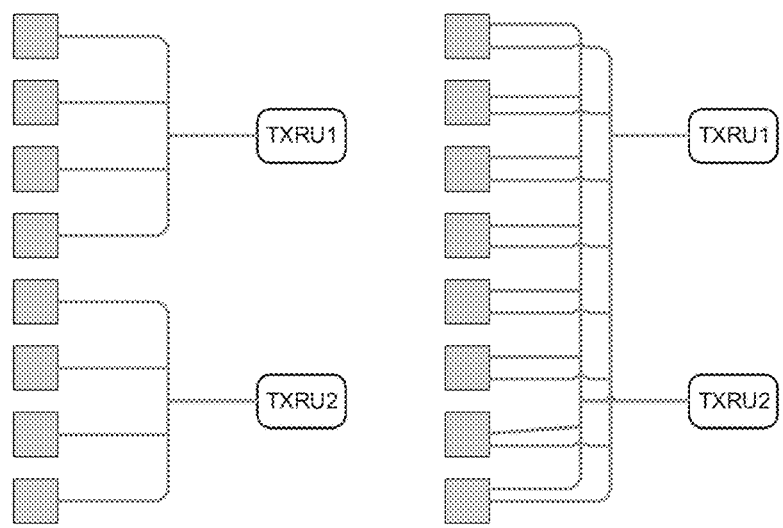
FIG. 3B illustrates a connection relationship between a transceiver unit (TXRU) and its antenna elements.

The TXRU and its antenna elements can be configured with a variety of correspondences, thereby changing capabilities and characteristics of beamforming. From the TXRU's perspective, a single TXRU can only contain a single row or column of antenna elements, that is, a so-called one-dimensional TXRU. At this time, the TXRU can only adjust the beam direction in one dimension; a single TXRU can also contain multiple rows or columns of antenna elements, that is, a so-called two-dimensional TXRU, and then, the TXRU can adjust the beam direction in the horizontal and vertical dimensions. From the perspective of antenna elements, for example, a column of antenna elements can constitute multiple TXRUs, but the constitution can be a partial connection as shown on the left side of FIG. 3B, where each TXRU uses only a part of the antenna elements to form a beam; it may also be a fully connection as shown on the right side of FIG. 3B, where each TXRU can adjust weighting coefficients of all antenna elements to form a beam.

Figure 3C:
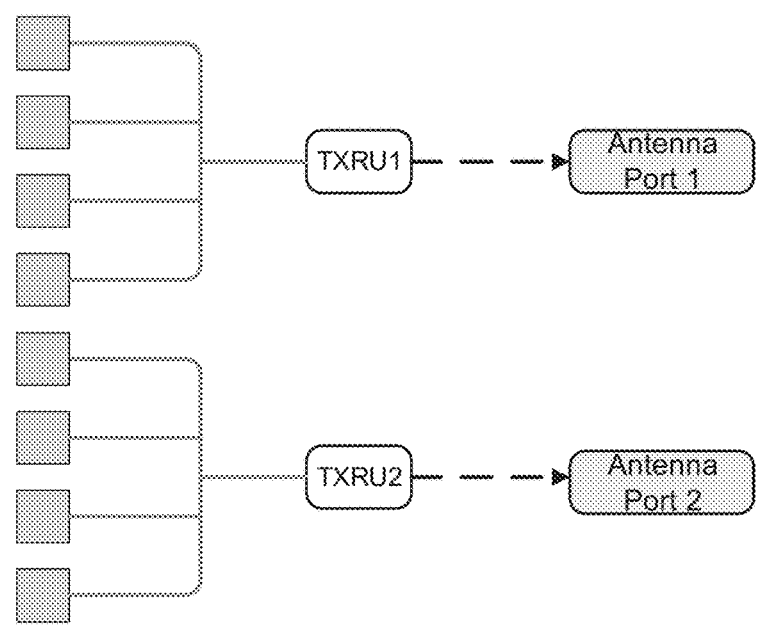
FIG. 3C illustrates a mapping between TXRUs and antenna ports.

Finally, one or more TXRUs form antenna ports seen on the system level through logical mapping. When a one-to-one mapping relationship is adopted between the TXRU and the antenna port, the TXRU and the antenna port are equivalent, as shown in FIG. 3C. Of course, depending on the system configuration, when two or more TXRUs are of coherent beam selection type, they can jointly form one antenna port.

"Antenna port" is defined such that as a channel carrying a symbol on a certain antenna port can be inferred from a channel carrying another symbol on the same antenna port. For example, for demodulation reference signal (DM-RS) associated with physical downlink shared channel (PDSCH), only when PDSCH symbol and DM-RS symbol are in the same transmission resource scheduled for the PDSCH, that is, in the same time slot and the same physical resource block group (PRG), the channel carrying the PDSCH symbol on one antenna port can be inferred from the channel carrying the DM-RS symbol on the same antenna port. This means that different signals transmitted by the same antenna port experience the same channel environment.

Generally speaking, the antenna port can be characterized by a reference signal. There is a one-to-one correspondence between an antenna port and a reference signal, and different antenna ports are used to transmitted different reference signals. The reference signal includes, for example, channel state information reference signal (CSI-RS), cell specific reference signal (CRS), DM-RS, and so on.

There may be a quasi-co-located (QCL) relationship between different antenna ports. If a large-scale property of a channel carrying symbols on one antenna port can be inferred from a channel carrying symbols on another antenna port, then the two antenna ports are considered to be quasi-co-located. This means that when, for example, the QCL relationship is satisfied between antenna port A and antenna port B, the channel parameter of large-scale property obtained by signal estimation on antenna port A are also suitable for the signal on antenna port B. The large-scale property includes at least one of delay spread, Doppler spread, Doppler shift, average gain, average delay, and spatial receiving parameters. In this sense, the antenna port can be regarded as an identification based on air interface environment of a physical channel or a physical signal. The channel environment of the same antenna port changes roughly the same, and the receiving side can perform channel estimation based on this to demodulate the transmission signal.

A process of transmitting data by the base station or the UE using the antenna array is described brief hereinafter. First, baseband signal representing a user data stream is mapped to m RF links (m≥1) through digital precoding. Each of the RF links up-converts the baseband signal to obtain a RF signal, and transmits the RF signal to an antenna array of the corresponding antenna port. According to the transmitting direction, a set of analog beamforming parameters are applied to antenna elements in the antenna array. The analog beamforming parameters may include, for example, phase setting parameters and/or amplitude setting parameters of antenna elements of the antenna array. According to the corresponding analog beamforming parameters, the electromagnetic wave radiation emitted by all antenna elements of the antenna array forms a desired beam in space. Receiving a beam by an antenna array has the same principle, that is, the analog beamforming parameters associated with a specific direction are applied to antenna elements in the antenna array, so that the antenna array can receive the beam in that direction. The above processing of beamforming using analog beamforming parameters may also be referred to as "analog precoding". The base station or the UE may pre-store a beamforming codebook, and the beamforming codebook includes beamforming parameters for generating a limited number of beams with different directions. The base station or the UE may also determine the transmitting direction or the receiving direction of the beam through channel estimation, thereby determining the beamforming parameters associated with the beam direction.

In addition, by performing a precoding operation at the antenna port level, more flexible digital beamforming can be achieved, such as single-user or multi-user precoding to achieve multi-stream or multi-user transmission.

By using the beamforming, the radiated energy can be concentrated in a specific direction to combat path loss. In order to achieve a full coverage, the base station and the UE need to have the ability to form many beams directed at different points, and before using a beam for transmission and reception, select a transmitting beam or a receiving beam from these beams that matches the channel direction as much as possible, that is, on the transmitting side, the transmitting beam is aligned with Angle of Departure of the channel, and on the receiving side, the receiving beam is aligned with Angle of Arrival of the channel.

[Beam Operations of the Present Disclosure]

Beam operations of a wireless communication system (for example, an NR communication system) are described below with reference to the drawings. The beam operations include processes such as beam scanning, beam measurement, beam reporting, beam selection, and beam indication. The wireless communication system determines the transmitting beam and the receiving beam to be used for data transmission by performing the beam operations.

Figure 4:
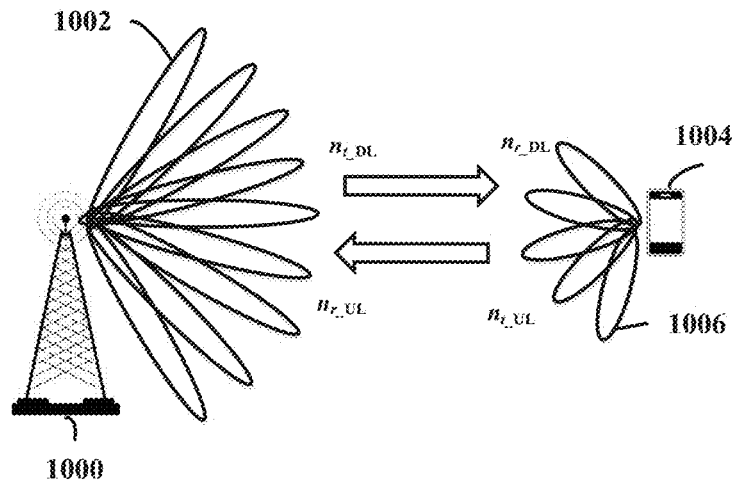
FIG. 4 schematically shows beams usable by base station and UE.

FIG. 4 schematically shows beams usable by the base station and the UE. In FIG. 4, the arrow to the right represents a downlink direction from the base station 1000 to the UE 1004, and the arrow to the left represents an uplink direction from the UE 1004 to the base station 1000. As shown in FIG. 4, the base station 1000 can use $n_{t\_DL}$ ($n_{t\_DL}$ is a natural number greater than or equal to 1) downlink transmitting beams aligned in different directions, and the UE 1004 can use $n_{r\_DL}$ ($n_{r\_DL}$ is a natural number greater than or equal to 1) downlink receiving beams aligned in different directions. Similarly, the base station 1000 may also use $n_{r\_UL}$ ($n_{r\_UL}$ is a natural number greater than or equal to 1) uplink receiving beams aligned in different directions, and the UE 1004 may also use $n_{t\_UL}$ ($n_{t\_UL}$ is a natural number greater than or equal to 1) uplink transmitting beams aligned in different directions. Although in FIG. 4, the number of uplink receiving beams and downlink transmitting beams 1002 of the base station 1000 and the coverage of each beam are the same, the number of uplink transmitting beams and downlink receiving beams 1006 of the UE 1004 and the coverage of each beam are the same, it should be understood that, according to system requirements and settings, the coverage and number of the uplink receiving beams and the downlink transmitting beams of the base station 1000 may be different, and the same is true for the uplink transmitting beams and the downlink receiving beams of the UE 1004.

In order to select the optimal transmitting beam-receiving beam pair, the base station 1000 and UE 1004 traverse all transmitting beam-receiving beam combinations. Beam scanning in downlink direction is taken as an example. First, the base station 1000 sequentially transmits $n_{t\_DL}$ transmitting beams in a candidate group of transmitting beams in downlink scanning periods, that is, performs the beam scanning. The $n_{t\_DL}$ transmitting beams may come from a beamforming codebook for the base station 1000, where each transmitting beam has a one-to-one correspondence with a set of beamforming parameters.

The beam scanning can utilize reference signal resources, such as non-zero-power CSI-RS (NZP-CSI-RS) resources. In addition, the beam scanning can also utilize SS/PBCH (Synchronization Signal/Physical Broadcast Channel, "SSB" for short) resource block in the initial access process, and here, the SSB and the CSI-RS play a similar role, so when the reference signal resources configured for the beam scanning are mentioned below, the CSI-RS resources and the SSB resources may be included. In such beam scanning based on reference signals, the base station 1000 transmits $n_{r\_DL}$ downlink reference signals to the UE 1004 by each of the $n_{t\_DL}$ transmitting beams. In this way, the $n_{t\_DL}$ transmitting beams of the base station 1000 sequentially transmit $n_{t\_DL} \times n_{r\_DL}$ downlink reference signals to the UE 1004.

The UE 1004 receives each transmitting beam by $n_{r\_DL}$ receiving beams 1006 in a candidate group of receiving beams, and measures the beam signals. For example, the UE 1004 can measure $n_{t\_DL}$ downlink reference signals carried in each of the transmitting beams, and the $n_{r\_DL}$ receiving beams of the UE 1004 receive a total of $n_{t\_DL} \times n_{r\_DL}$ downlink reference signals from the base station 1000. The UE 1004 measures the $n_{t\_DL} \times n_{r\_D}$ downlink reference signals, respectively, and for example, measures reference signal received power (RSRP), reference signal received quality (RSRQ), signal to interference plus noise ratio (SINR), etc. This process can be called "beam measurement".

Then, the UE 1004 reports beam information such as beam measurements to the base station 1000 in form of a beam report. This process may be referred to as "beam reporting". In order to reduce the reported data amount, the UE 1004 may be configured to report the beam information for only a part of the transmitting beams, for example, only report beam information for Nr (Nr is pre-configured by the base station 1000, generally $1 \leq Nr \leq 4$) transmitting beams. For example, the UE 1004 can report the measurements and indicators of Nr reference signals. Due to the correspondence between the reference signal and the transmitting beam as well as the receiving beam, the measurement of each reference signal indicates beam information for a pair of transmitting beam-receiving beam.

According to a predetermined beam selection strategy, the base station 1000 selects the optimal transmitting beam from the transmitting beams reported by the UE 1004 for downlink transmission with the UE 1004, that is, performs "beam selection". In an example, the base station 1000 may select the transmitting beam corresponding to the reference signal with the best measurement as the optimal transmitting beam, and the direction of the transmitting beam generally best matches the channel direction.

Then, the base station 1000 indicates the selected optimal transmitting beam to the UE 1004. This process may be referred to as "beam indication". For example, the base station 1000 may send a reference signal indicator corresponding to the optimal transmitting beam to the UE 1004, so that the UE 1004 can determine the receiving beam corresponding to the reference signal as the optimal receiving beam. This receiving beam achieves the best reception for the optimal transmitting beam and its direction generally best matches the channel direction. Thereafter, the base station 1000 and the UE 1004 can use the determined optimal transmitting beam and optimal receiving beam to perform downlink transmission.

According to the present disclosure, the beam selected by the wireless communication system will not be limited to one, and two or more beams can also be selected, that is, the multi-beam operation can be supported. By using multiple beams in downlink transmission, the transmission path of the beams has a decreased possibility of being blocked, the SINR level of the received signal is increased, and an additional spatial diversity gain is obtained. It is beneficial especially for application scenarios where the channel condition is not good or the reliability has high requirements.

In view that there have been many introductions about the single-beam operation in the prior art, the following will focus on describing the multi-beam operation according to the present disclosure.

The multi-beam operation according to the present disclosure has no substantial difference from the single-beam operation in the beam scanning process and the beam measurement process. Specifically, the beam scanning process transmits all candidate transmitting beams in the candidate transmitting beam group one by one, and the beam measurement process measures each candidate transmitting beam to obtain beam information (for example, RSRP, RSRQ, SINR, CQI, etc.) of each of the transmitting beams. These two processes can support the multi-beam operation well.

For the beam reporting process, the number Nr of beams for which the UE needs to report beam information is configured by the base station. In general, the number Nr of beams reported by the UE should be greater than or equal to the number of beams to be selected. On one hand, the larger Nr is, the more options the base station has, and the base station can select the most suitable multiple transmitting beams according to a predetermined beam selection strategy. However, on the other hand, the larger Nr means the larger amount of beam information to be transmitted and the more transmission resources to be occupied. The wireless communication system needs to consider a tradeoff of many factors in the configuration of Nr.

The multi-beam operation according to the present disclosure includes selecting multiple (assumedly Ms, Ms is a natural number greater than or equal to 2) transmitting beams based on the reported beam information, wherein the multiple transmitting beams are mutually compatible.

As used in the present disclosure, the term "mutually compatible" means that these transmitting beams can be transmitted and received simultaneously. Specifically, on one hand, the base station can transmit these Ms beams simultaneously, that is, the Ms transmitting beams are compatible in transmitting. On the other hand, the UE can receive the Ms beams simultaneously, that is, the Ms beams are compatible in receiving. Only when the Ms transmitting beams are both compatible in transmitting and compatible in receiving, they can be selected for the multi-beam operation; otherwise, they cannot be selected for the multi-beam operation.

Exemplary embodiments of the beam selection according to the present disclosure are provided below.

First Embodiment of Beam Selection

According to the first embodiment of beam selection of the present disclosure, the base station selects the transmitting beams according to a beam reporting mode for the UE. The UE may be configured to report beam information using either a group-based beam reporting mode or a non-group-based beam reporting mode.

For example, in the 5G NR communication system, the base station can configure the beam reporting mode for the UE by setting an RRC layer parameter groupBasedBeamReporting.

More specifically, if the groupBasedBeamReporting parameter is set to "disabled", the UE is configured to use the non-group-based beam reporting mode in the subsequent beam reporting. The UE reports nrofReportedRS (configured by the higher layer, its upper limit is for example 4) different transmitting beams to the base station in a single beam report. The nrofReportedRS transmitting beams on the base station side are beams with the highest beam measurements (for example, L1-RSRP, L1-RSRQ, L1-SINR). However, the compatibility of the nrofReportedRS transmitting beams of the base station side is uncertain. For example, some transmitting beams may be received by the same antenna array of the UE at different time, which means that the transmitting beams of the base station side cannot be received by the UE simultaneously, because one antenna array can usually form only one receiving beam at a time.

If the groupBasedBeamReporting parameter is set to "enabled", the UE is configured to use the group-based beam reporting mode in the subsequent beam reporting. The UE reports two different transmitting beams of base station side in a single report instance, wherein the two transmitting beams of base station side can be received simultaneously by the UE using a single antenna panel (for example, the same receiving beam can simultaneously receive two transmitting beams of the base station) or multiple antenna panels.

It can be seen from the above that the group-based beam reporting mode can provide a guarantee for the receiving compatibility between the reported beams, while the non-group-based beam reporting mode cannot provide such a guarantee. In the first embodiment according to the present disclosure, the base station uses a difference between the two beam reporting modes to perform the following beam selection for downlink transmission.

Figure 5:
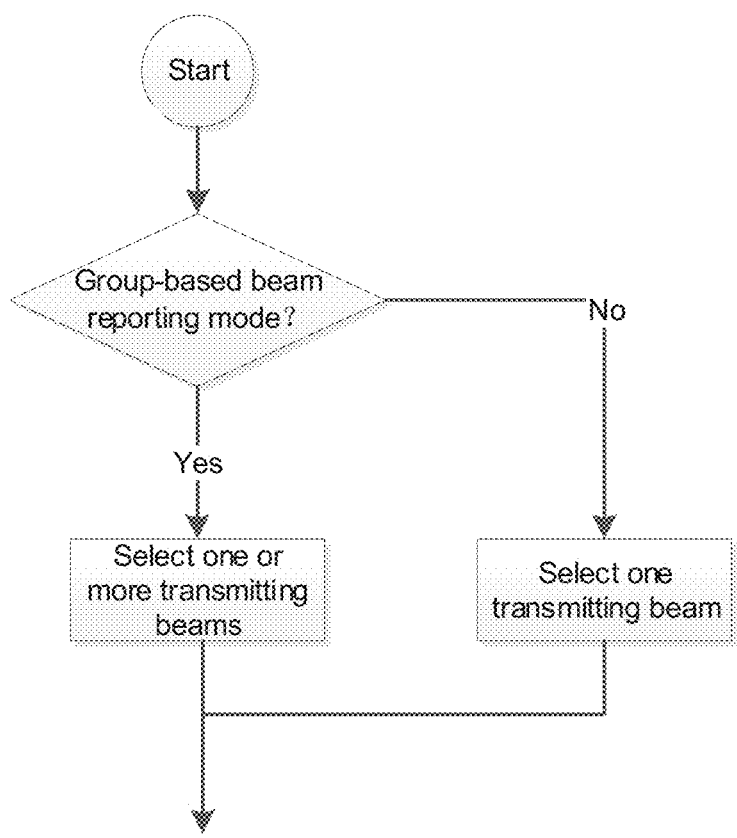
FIG. 5 is a flowchart illustrating beam selection according to the first embodiment of the present disclosure.

FIG. 5 is a flowchart illustrating the beam selection according to the first embodiment of the present disclosure. As shown in FIG. 5, the base station determines the beam reporting mode for the UE, for example, by retrieving the RRC parameter groupBasedBeamReporting set for the UE.

In case where the groupBasedBeamReporting parameter is "disabled", the base station is restricted to only select a single transmitting beam. The base station will select only one transmitting beam from the nrofReportedRS beams reported by the UE, that is, as in the single-beam operation.

Then, the base station indicates the selected single transmitting beam to the UE. The indicating of the single beam can use the existing beam indication mechanism. The UE receives the beam indication information from the base station, and determines the optimal receiving beam associated with the indicated transmitting beam in combination with the results of previous beam scanning and measurement. In the subsequent data transmission, the base station will use the selected transmitting beam for data or signaling transmission, and the UE will use the selected receiving beam for data or signaling reception.

In case where the groupBasedBeamReporting parameter is "enabled", the base station can select one transmitting beam for the single-beam operation based on the beam information reported by the UE, or select two or more transmitting beams for the multi-beam operation.

When the base station selects a single transmitting beam, this transmitting beam can have the highest measurement.

The base station can use the single-beam indication mechanism to indicate this transmitting beam to the UE.

When the base station selects two or more (for example, Ms, Ms≥2) transmitting beams, these transmitting beams are selected from those beams reported by the UE in a single beam report and have the highest measurements. The base station indicates the Ms transmitting beams to the UE by the multi-beam indication mechanism that will be introduced later.

Alternatively, if the groupBasedBeamReporting parameter is "enabled", the base station is restricted to perform the multi-beam operation, that is, the base station needs to select two or more transmitting beams for the multi-beam operation. From the perspective of the UE, if the configured groupBasedBeamReporting parameter is "enabled", the UE will receive indication information about multiple transmitting beams and determine corresponding multiple receiving beams.

The advantage of this is that the type of beam operation is specified while setting the beam reporting mode with the groupBasedBeamReporting parameter. In this way, the group-based beam reporting mode is associated with the multi-beam operation, and the non-group-based beam reporting mode is associated with the single-beam operation, so that the communication system can formulate a more concise beam selection strategy.

The Second Embodiment of Beam Selection

According to the second embodiment of beam selection of the present disclosure, in addition to the beam information based on the Nr transmitting beams reported by the UE, the base station performs the beam selection based on compatibility information of the Nr transmitting beams.

The compatibility information includes transmitting compatibility information obtained from the base station indicating whether the Nr transmitting beams can be transmitted simultaneously.

In an example, the base station determines whether the above Nr transmitting beams are compatible in transmitting based on the number of antenna arrays/panels or antenna ports that can be used for downlink transmission with the UE. Specifically, assuming that each of the antenna arrays/panels of the base station can apply corresponding beamforming parameters to form a transmitting beam, the number of antenna arrays/panels that can be allocated to the UE by the base station for downlink transmission represents the number of beams that can be transmitted simultaneously, which number is also the maximum number of beams that can be selected by the base station. Therefore, the base station can select transmitting beams no more than this number. For another example, since one antenna port is used to form only one beam at the same time, the antenna port that can be allocated to the UE to transmit data stream will limit the maximum number of beams that can be selected by the base station.

In another example, when the base station has enough antenna arrays available, and its beamforming capability is not a factor that affects the simultaneous transmission of beams, the base station may not consider the transmitting compatibility between the transmitting beams.

The compatibility information also includes receiving compatibility information indicating whether the above Nr transmitting beams can be received simultaneously by the UE. The receiving compatibility generally depends on beamforming capability of the UE. The UE as the receiving end can determine the receiving compatibility between the transmitting beams through the reception of the antenna array.

Figures 6, 7:
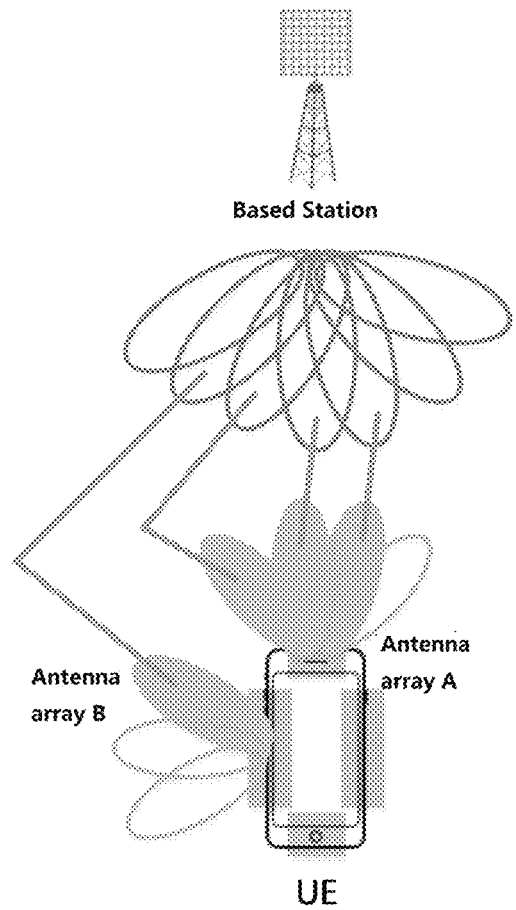
FIG. 6 illustrates a case where the UE uses antenna arrays to receiving beams.
FIG. 7 is an example of respective fields and their bit width in FIGS. 8A-8C.

The receiving compatibility of the beam is explained below with reference to FIG. 6. As shown in FIG. 6, it is assumed that the base station tests 7 transmitting beams a1-a7 sequentially through beam scanning, and the UE tests 7 receiving beams b1-b7 sequentially. Here, the beam scanning can adopt various methods. For example, for the receiving beam b1, the base station scans the transmitting beams a1-a7 in sequence, and then for the receiving beam b2, the base station scans the transmitting beams a1-a7 in sequence, and so on. Alternatively, the base station first transmits the transmitting beams a1 at 7 times, the UE uses the receiving beams b1-b7 to receive the transmitting beam a1, then the base station transmits the transmitting beams a2 at 7 times, and the UE uses the receiving beams b1-b7 to receive the transmitting beam a2, and so on. The base station and the UE may also adopt other suitable beam scanning methods.

In the example shown in FIG. 6, the UE uses two antenna arrays to form the receiving beams. Of course, the UE can also use more or fewer antenna arrays. Among them, the receiving beams b1-b4 are formed by antenna array A, and the receiving beams b5-b7 are formed by antenna array B. Generally, the antenna array A as a TXRU can only form one receiving beam at a time, and the same is true for the antenna array B. Therefore, the receiving beams b1, b2, b3 and b4 cannot be formed at the same time, and the receiving beams b5, b6 and b7 cannot be formed at the same time. However, any one of the receiving beams b1-b4 and any one of the receiving beams b5-b7 may be formed at the same time.

Assuming that after sorting the beam measurements, the UE chooses to report four transmitting beams a2, a3, a4 and a5, and the corresponding receiving beams are b7, b1, b2 and b3, as shown in FIG. 6. It should be noted that the number of transmitting beams Nr=4 reported by the UE is only exemplary, and it can be any value configured by the base station. From the above discussion, it can be seen that the receiving beams b1, b2 and b3 cannot be formed at the same time, which means that the transmitting beams a3, a4 and a5 cannot be received simultaneously by the UE, that is, they are incompatible. However, any one of the receiving beams b1, b2 and b3 can be formed simultaneously with the receiving beam b7, which means that any one of the transmitting beams a3, a4 and a5 is compatible with the transmitting beam b2.

To facilitate the base station to select multiple transmitting beams which are mutually compatible for the multi-beam operation, the UE can report such compatibility information to the base station.

Preferably, the UE can report the receiving compatibility information of the transmitting beams together with the measurements (beam information) to the base station. For example, the UE may add an additional field in the beam report to indicate the receiving compatibility information. The advantage of this is that the amount of signaling sent by the UE to the base station can be reduced.

Of course, the reporting of the receiving compatibility information and the reporting of the beam information can be performed independently without modifying the format of the beam report. For example, the UE may add the receiving compatibility information of beams to uplink control information (UCI) and send it to the base station via physical uplink control channel (PUCCH) or physical uplink shared channel (PUSCH).

Several exemplary methods for representing the receiving compatibility information of the transmitting beams are introduced below. Preferably, these representing methods include the receiving compatibility information in the beam report together with the measurement information of the beams, but may not be limited thereto.

In beam scanning using reference signal resources, since the reference signals carried in the transmitting beams are different from each other, an indicator of a reference signal can be used as identification information of a transmitting beam. In addition, in case where different reference signals are received by different receiving beams of the UE, an indicators of a reference signal may also be used as identification information of a receiving beam. Therefore, when the beam operation mentioned below is related to the reference signal, identification of the beam can be achieved by an indicator of the reference signal (for example, CSI-RS resource indicator (CRI) or SSB resource indicator (SSBRI)), which are equivalent.

In the example described above with reference to FIG. 6, the transmitting beams to be reported by the UE include a2-a5, and the UE may combine the indicator of the reference signal transmitted by the transmitting beam a2 and received by the receiving beam b7, the indicator of the reference signal transmitted by the transmitting beam a3 and received by the receiving beam b1, the indicator of the reference signal transmitted by the transmitting beam a4 and received by the receiving beam b2, and the indicator of the reference signal transmitted by the transmitting beam a5 and received by the receiving beam b3 are reported to the base station with the measurements of various reference signals.

Figures 8C, 9:
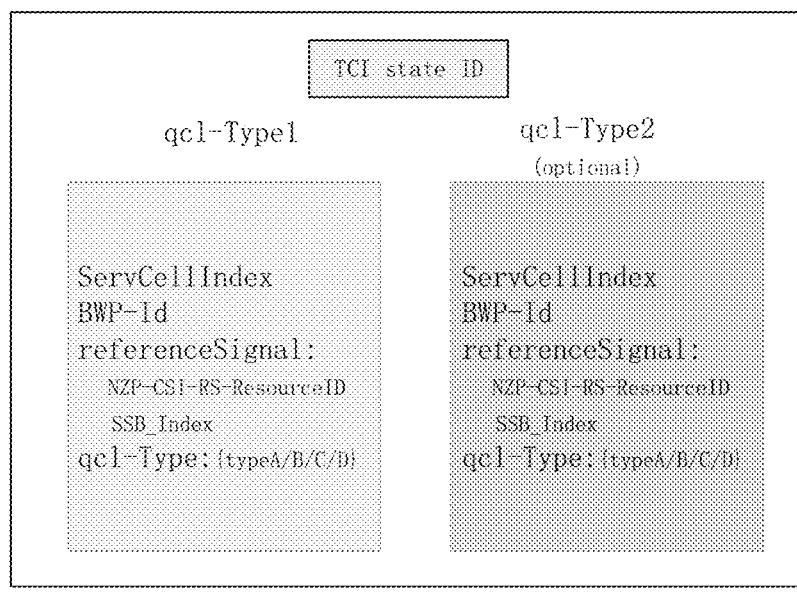

FIGS. 8A, 8B and 8C respectively show examples of including receiving compatibility information in the beam report. In FIGS. 8A-8C, the reported transmitting beam are represented by the indicator such as (CRI or SSBRI) of corresponding reference signal, but the present disclosure may not be limited thereto. For example, a beam may be represented by a beam index capable of identifying the beam, and the beam index may correspond to a set of beamforming parameters that form the beam. In the following discussion, it is assumed that the number of beams to be reported by the UE Nr>1 (for example, Nr is 2, 3, 4, etc.), because there is no so-called compatibility problem if only one beam is reported.

FIG. 7 is a relationship between each field and its bit width in FIGS. 8A-8C. In FIG. 7, CRI is CSI-RS indicator in case where CSI-RS resource is used, which occupies one bit, wherein $K_S^{CSI-RS}$ represents the number of CSI-RS resources in the CSI-RS resource set as used, and the symbol "⌈ ⌉" means rounding up; SSBRI is SS/PBCH resource indicator in case where SS/PBCH resource is used, which occupies $\lceil \log_2(K_S^{SSB}) \rceil$ bit, wherein $K_S^{SSB}$ represents the number of SS/PBCH blocks configured in the SS/PBCH resource set; RSRP means a measured value of reference signal received power and is quantized into 7 bits; differential RSRP represents a difference from the RSRP measurement of a specific reference signal, which is quantized into 4 bits.

In the example of FIG. 8A, the beam report (in this example, it is a CSI report) contains the indicators and measurement values of the reference signals, where the measurement values of the transmitting beam #2, #3 and #Nr (respectively represented by CRI or SSBRI #2, #3 and #Nr, if any) are differential RSRPs relative to the transmitting beam #1 (represented by CRI or SSBRI #1).

In addition, the beam report may also include a field indicating the receiving compatibility information of the beams, such as MultiBeamTxAvailable. This field occupies 1 bit and indicates binary information as to whether the listed reference signals (transmitting beams) are mutually compatible. For example, if the Nr beams listed in the beam report are mutually compatible, the field is set to "1", otherwise, the field is set to "0".

In case where the number of beams reported by the UE is Nr=1, the UE may not add this field in the beam report or simply set it to "1".

After receiving the beam report, the base station obtains the receiving compatibility information of the beams by identifying the included MultiBeamTxAvailable field. For example, if the field is "1", it indicates that the listed Nr beams are mutually compatible, and multiple beams can be selected from them for use. On the contrary, if the field is "0", it indicates that the Nr beams are not mutually compatible, and the base station will perform the single-beam operation.

In an example of FIG. 8B, the beam report may add a mark for each of the transmitted beams as reported. For example, a mark Mark1 is added for the transmitting beam #1, and similarly, for the transmitting beams #2, #3, #Nr (If any), marks Mark2, MarkNr, MarkNr are added, respectively. Depending on different marking methods, the fields Mark1, Mark2, Mark3 or MarkNr can occupy 1 bit, 2 bits, 3 bits, etc. Generally speaking, the larger the bit width of the mark field is, the richer compatibility information can be represented, but it is at the cost of precious transmission resources.

As a marking method, beams that can be received simulataneously (that is, being receiving compatible) may be set with the same mark, while beams that cannot be received simulataneously may be set with different marks. In this way, the base station can identify which beams are compatible and which beams are incompatible based on the marks.

As another marking method, the UE can set the marks according to the antenna arrays associated with the beams. For the convenience of explanation, referring to the example where the transmitting beams a2-a5 are to be reported in FIG. 6, since the receiving beams b1-b3 associated with the transmitting beams a3-a5 are all formed by the same antenna array A, the transmitting beams a3-a5 will be set with the same first mark; and the receiving beam b7 associated with the transmitting beam a2 is formed by another antenna array B, then the transmitting beam a2 will be set with the second mark. Therefore, the base station can recognize that the transmitting beams a3-a5 are incompatible according to the mark field included in the beam report, but any one of the transmitting beams a3-a5 are mutually compatible with the transmitting beam a2.

The UE may also use other marking methods, as long as the base station can correctly identify the compatibility of the beams as agreed.

In the example shown in FIG. 8C, it is not necessary to add a mark for each transmitting beam in the beam report, but to add subset information of the Nr beams to be reported. For example, the UE may divide the beams that can be received simultaneously into a subset, and add information of this subset in the beam report. As shown in FIG. 8C, assuming that the transmitting beam #3 and the transmitting beam #4 can be received simultaneously, they can be divided into a subset and identified by the field "Subset3". After identifying that the field "Subset3" is set, the base station considers that the transmitting beam #3 and transmitting beam #4 immediately following this field are mutually compatible as agreed. Although the subset information field in FIG. 8C is set before indicator(s) of transmitting beam(s) in a subset, it can also be set after indicator(s) of transmitting beam(s) in a subset, and the base station may consider that the transmitting beams listed before the field are mutually compatible.

Although several examples of representing the receiving compatibility information are taken above, the present disclosure is not limited thereto. The receiving compatibility information according to the present disclosure can be expressed in other ways, as long as it can be identified by the base stations agreed. In addition, in the above example, the position, size, assignment, and meaning of the field can have other variations, as long as there is no ambiguity between the base station and the UE.

The base station selects transmitting beams to be used for downlink transmission based on both of the beam measurements and compatibility information about the Nr transmitting beams reported by the UE. Compared with the single-beam operation that only needs to take the beam measurements into account, the beam selection in the multi-beam operation is more complicated because the compatibility between the beams also needs to be taken into account. As an example of the beam selection strategy, the base station can determine all compatible beam combinations based on the compatibility information, wherein the beams in each compatible beam combination are mutually compatible, and then the base station can perform a comparison between compatible beam combinations based on the beam measurements, so as to select two or more beams to be used from a certain compatible beam combination. It is possible that there is only one compatible beam combination. There may even be no compatible beam combination, and at this time, the base station can perform only the single beam operation.

It should be noted that the second embodiment of beam selection described above is particularly suitable for the case where the UE performs beam reporting in a non-group-based beam reporting mode. The second embodiment can be combined with the first embodiment, that is, in case where the UE reports beam information in the group-based beam reporting mode, the base station selects multiple transmitting beams as described in the first embodiment; and in case where the UE reports beam information in the non-group-based beam reporting mode, the base station selects multiple transmitting beams based on the compatibility information of the beams as described in the second embodiment.

The multi-beam operation according to the present disclosure further includes indicating the selected transmitting beams to the UE. The traditional wireless communication system only supports the indication of a single beam, but cannot support the indication of multiple beams. If the base station indicates the selected multiple beams one by one, it may not be understood by the UE due to ambiguity, or it may be understood as switching of the beams.

To tackle this, the present disclosure provides a multi-beam indication mechanism that can work with the above embodiments of beam selection.

Multi-Beam Indication of the Present Disclosure

In the beam operation using reference signal resources, the beams may be identified by identifiers or indexes of associated reference signal resources. In the multi-beam mechanism according to the present disclosure, transmission configuration indication (TCI) state containing identification information on reference signal resources is used to indicate the beam.

FIG. 9 illustrates a configuration of the TCI state. As shown in FIG. 9, the TCI state is identified by TCI state ID. Each TCI state contains parameters for configuring the quasi co-location (QCL) relationship between one or two downlink reference signals and DMRS port of PDSCH. For the first downlink reference signal, such quasi co-location relationship is configured by the RRC layer parameter qcl-Type1. If there is the second downlink reference signal, the quasi co-location relationship is configured by qcl-Type2. As shown in FIG. 9, the qcl-Type1 or qcl-Type2 parameters include the following information: serving cell index Serv-CellIndex; bandwidth part ID BWP-Id; source reference signal resources that provide QCL information, including NZP-CSI-RS resources (identified by NZP-CSI-RS-ResoureId) and SSB resources (identified by SSB-Index). The quasi co-location type corresponding to each downlink reference signal is given by the qcl-Type parameters including the following types:

"QCL-TypeA": {Doppler shift, Doppler spread, average delay, delay spread};
"QCL-TypeB": {Doppler shift, Doppler spread};
"QCL-TypeC": {Doppler shift, average delay};
"QCL-TypeD": {Space receiving parameters}.

In order to avoid ambiguity, each TCI state is allowed to contain only one quasi co-location hypothesis of the type "QCL-TypeD".

The base station may pre-configure at most M (for example, M=64, but not limited thereto) TCI states for the UE. Then, the base station can refer to the TCI state ID in a control signaling such as MAC control element (MAC CE) or downlink control information (DCI). The UE decodes the control signaling and extracts the TCI state ID, finds qcl-Type1 or qcl-Type2 whose qcl-Type parameter is set to "QCL-TypeD" in the TCI state identified by the TCI state ID, and finds the indicator of the source reference signal, such as NZP-CSI-RS-ResoureId or SSB-Index. The UE will assume that the port of the source reference signal has a quasi co-location relationship with DM-RS port of PDCCH or PDSCH scheduled by the above control signaling, so that the UE can use the spatial receiving parameters for receiving the source reference signal to prepare for receiving the scheduled PDCCH or PDSCH data. Specifically, the UE assumes that the base station uses the same transmitting beam in transmitting the source reference signal previously and in transmitting the PDCCH or PDSCH in future, and thus uses the same receiving beam as in receiving the source reference signal for reception.

The present disclosure designs different multi-beam indication mechanisms for transmission of different physical channels.

1) Multi-Beam Indication Example 1

According to the multi-beam indication example 1 of the present disclosure, the base station can activate the selected Ms beams by transmitting a MAC CE for scheduling PDCCH. As used herein, "activate" refers to enabling those beams listed by the MAC CE from the beam set configured for the UE. After the activation, the base station can use the Ms transmitting beams to perform PDCCH transmission and the UE can use the receiving beams corresponding to the Ms transmitting beams to monitor the PDCCH, for example, after 3 ms.

Figure 10:
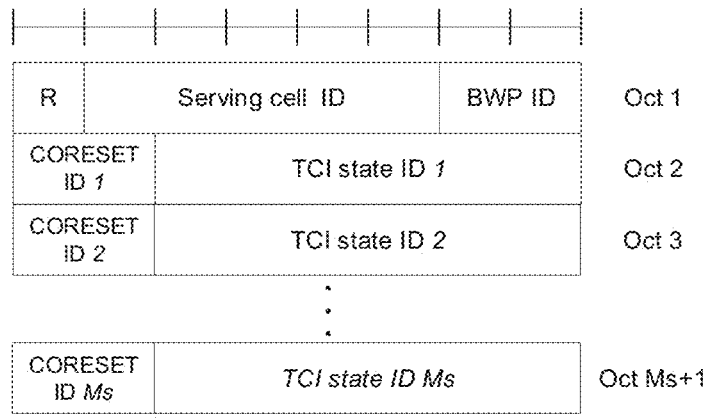
FIG. 10 illustrates an example of MAC CE for activating TCI states according to multi-beam indication example 1.

The base station generates a single MAC CE including TCI state IDs associated with the Ms beams selected in the beam selection at the MAC layer, and the format of the MAC CE is shown in FIG. 10.

In the MAC CE shown in FIG. 10 (the MAC CE header is not shown):

The first octet: 'R' field indicates a reserved bit; 'serving cell ID' field indicates ID of a serving cell to which the MAC CE applies, and its length is 5 bits; the 'BWP ID' field contains BWP-Id of downlink bandwidth part to which the MAC CE applies, and its length is 2 bits;

The second octet: an identifier (CORESET ID 1) of a control resource set (ControlResourceSet) of PDCCH associated with the first beam, and an identifier 'TCI State ID 1' of the TCI state of the PDCCH, these two identifiers occupy 2 bits and 6 bits, respectively; the 6-bit TCI-StateId can indicate up to 64 TCI states;

The third octet is similar to the second octet, but the TCI state ID therein indicates the TCI state associated with the second beam;

By analogy, when the base station indicates Ms beams, the MAC CE needs to include the TCI state IDs and CORESET IDs of Ms entries associated with these beams (Ms octets in total).

In the multi-beam operation, the base station can use a MAC CE of variable length to transmit a variable number of TCI states.

Thus, the above-mentioned MAC CE contains identification information of the Ms beams to be activated, that is, a TCI activation list TCI-statePDCCH-ToAddList containing {TCI state ID 1, TCI state ID 2, . . . , TCI state Ms}.

The UE receives the MAC packet containing the MAC CE and submits it to the UE's MAC layer for decoding. The UE extracts the Ms CORESET IDs and TCI state IDs in the MAC CE, and finds the source reference signal set for which "QCL-TypeD" is set in the TCI state identified by each TCI state ID. Then, the UE assumes that the port of the found source reference signal and the DM-RS port of PDCCH are in a quasi co-location relationship, so as to prepare for receiving the PDCCH using the spatial receiving parameters (receiving beams) used when receiving the same source reference signal previously. After the configuration of the MAC CE starts to take effect (for example, after 3 ms), the UE will start to use the determined receiving beams to monitor the PDCCH.

2) Multi-Beam Indication Example 2

In the above multi-beam indication example 1, the base station indicates the selected Ms beams at one time by a single MAC CE, that is, the identification information (TCI State IDs) associated with the Ms beams is included in one MAC CE. Therefore, during a period in which the MAC CE takes effect, the UE uses the corresponding Ms receiving beams to monitor and receive the PDCCH every time.

In the multi-beam indication example 2 according to the present disclosure, the base station schedules multiple PDCCH transmissions for the same content by multiple MAC CEs.

In application scenarios with high reliability requirements, such as ultra reliability and low latency communication (URLLC), the base station may need to transmit the same content to the UE multiple times to ensure successful transmission. The base station can indicate different beam(s) for each transmission.

For example, for Maxnr PDCCH transmissions for the same content, the base station can use Maxnr MAC CEs to activate one or more beams to be used for each PDCCH transmission.

Figure 11:
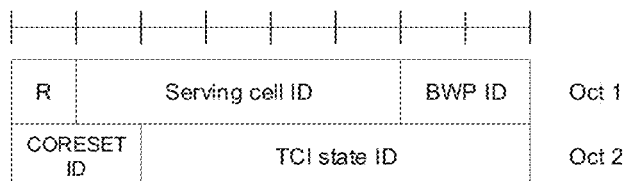
FIG. 11 illustrates an example of MAC CE for activating TCI states according to multi-beam indication example 2 or 3.
Figure 11:
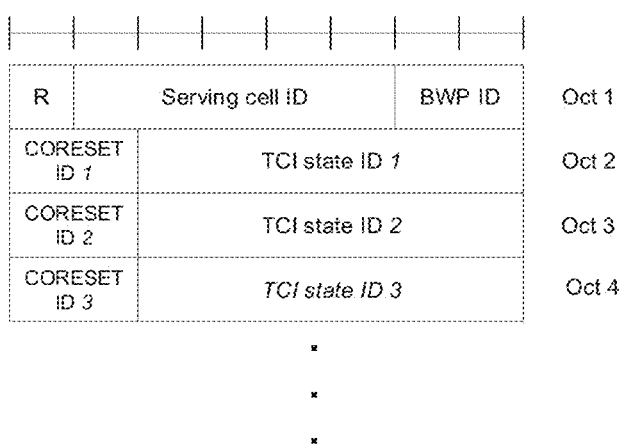
Figure 11:
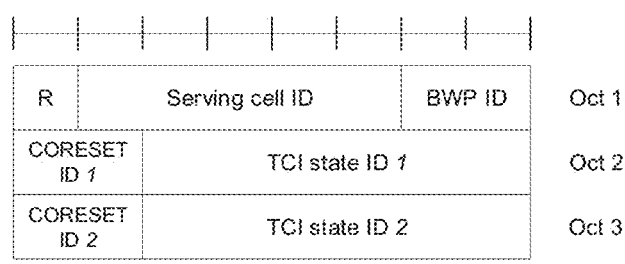

As shown in FIG. 11, for the first PDCCH transmission, the first MAC CE activates a TCI state list TCI-statePDCCH-ToAddList1, which contains a TCI state ID corresponding to one beam; for the second PDCCH transmission, the second MAC CE activates a TCI state list TCI-statePDCCH-ToAddList2, which contains TCI state IDs corresponding to the three beams; similarly, for the Maxnr-th PDCCH transmission, the Maxnr-th MAC CE activates a TCI state list TCI-statePDCCH-ToAddList-Maxnr, which contains a TCI state ID corresponding to one beam. This process can be seen as an extended multi-beam indication in the time domain.

It should be noted that the number and index of beams indicated for each PDCCH transmission are not limited to the example in FIG. 11, but any one or more of the Ms beams may be selected by the base station. However, it is preferable that the selected Ms beams are activated at least once, so as to make full use of the Ms beams.

Preferably, the Maxnr MAC CEs are included in one MAC layer signaling packet to be sent to the UE.

The UE receives the MAC layer signaling packet via PDSCH and extracts the above-mentioned Maxnr MAC CEs. In the TCI state(s) indicated by the TCI state ID(s) listed in each MAC CE, the UE finds the indicator (equivalent to identification information of the beam) of the source reference signal for which "QCL-TypeD" is set, and the UE assumes that the port of the found source reference signal and the DM-RS port of PDCCH are in a quasi co-location relationship, so that the PDCCH is received using the spatial receiving parameters (receiving beam(s)) used when receiving the same source reference signal previously. After the MAC CE configuration starts to take effect (for example, after 3 ms), the base station uses the indicated transmitting beams to perform PDCCH transmissions for the same content on the corresponding CORESET resource sets in sequence, and the UE will start to use the determined receiving beams to monitor and receive the PDCCH on the corresponding CORESET resource sets.

Since the transmitting beam(s) used for each PDCCH transmission is different, the UE can achieve a high transmission success rate by jointly decoding these Maxnr transmissions.

3) Multi-Beam Indication Example 3

The multi-beam indication example 3 according to the present disclosure is similar to the multi-beam indication example 2, except that hybrid automatic repeat request (HARD) is introduced in repeated PDCCH transmissions for the same content.

First, assuming that the upper limit of the number of PDCCH transmissions is MaxReTxPDCCH, and the base station pre-schedules resources for the MaxReTxPDCCH PDCCH transmissions of the same content. As in the above multi-beam indication example 2, the base station indicates one or more beams for each PDCCH transmission, which will not be repeated here.

Then, the base station performs the first PDCCH transmission, and receives acknowledgement information for this PDCCH transmission from the UE, such as ACK indicating successful transmission or NACK indicating unsuccessful transmission. If the UE successfully receives and decodes the first PDCCH transmission, it will send an ACK to the base station, and the base station will terminate the PDCCH transmissions. On the contrary, if the UE fails to successfully receive and decode the first PDCCH transmission, it will send a NACK to the base station, and the base station will use one or more beams indicated for the second PDCCH transmission to perform the second PDCCH transmission for the same content.

Similarly, the base station receives acknowledgement information for the second PDCCH transmission. If it is an ACK, the base station will terminate the transmissions; otherwise, it will continue the third PDCCH transmission for the same content.

If the base station fails to receive any ACK message from the UE, the base station will complete the MaxReTxPDCCH PDCCH transmissions.

Since the transmitting beam(s) used for each PDCCH transmission are different, the UE can improve the transmission success rate by jointly decoding the beam signals transmitted via different beam paths.

4) Multi-Beam Indication Example 4

The multi-beam indication example 4 according to the present disclosure relates to a method of multi-beam indication that can be used for PDSCH transmission.

Similar to the multi-beam indication that can be used for PDCCH transmission, the base station can schedule multiple beams to be used for PDSCH transmission by sending multiple TCI state IDs to the UE.

Specifically, the base station configures up to M (for example, M=64) TCI states for the UE at the RRC layer, and then activates up to 8 TCI states for the UE by MAC CE. However, if the TCI states configured by the RRC layer do not exceed 8, that is, M≤8, the activation by MAC CE is not required.

Figures 12, 13:
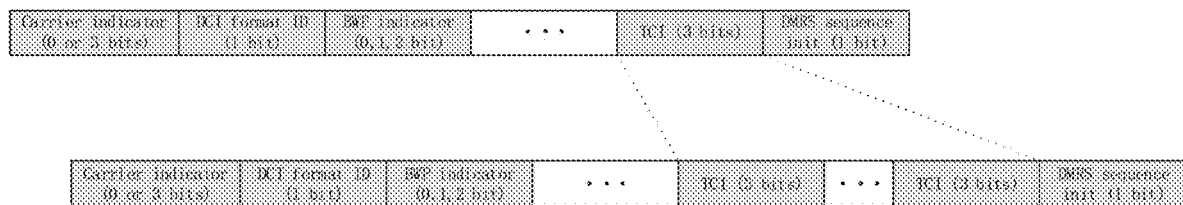
FIG. 12 illustrates an example of MAC CE for activating TCI states according to multi-beam indication example 4.
FIG. 13 illustrates an example of DCI for specifying TCI states according to multi-beam indication example 4.

FIG. 12 illustrates a format (excluding the header) of the MAC CE used to activate the TCI states. As shown in FIG. 12, "R" field represents a reserved bit, "Serving cell ID" represents identification information of a serving cell to which the MAC CE applies, which occupies 5 bits, and "BWP ID" represents identification information (for example, BWP_Id) of a downlink bandwidth part to which the MAC CE applies, which occupies 2 bits; "$T_i$" represents activation information of the M TCI states configured by the RRC layer, which occupies 1 bit, and if it is set to "1", it means to activate the corresponding TCI state, otherwise it means to deactivate the corresponding TCI state.

Then, the base station may specify a beam scheduled for PDSCH transmission in DCI, for example, by including a TCI state associated with the beam in the DCI. FIG. 13 illustrates a format of DCI that can be used to specify the TCI state, wherein the upper is DCI used for traditional single-beam indication, including an identification field of the TCI state associated with one beam, and the lower is DCI for the multi-beam indication according to the multi-beam indication example 4 of the present disclosure, including identification fields of the TCI states associated with the multiple beams. Each of the TCI state identification fields occupies 3 bits to indicate one of at most 8 TCI states. Preferably, the DCI may have a format of variable length to adapt to the number Ms of beams as determined in the beam selection. At this time, the base station needs to configure a parameter in advance to inform the UE of the number of TCI states contained in the DCI (that is, the number of beams for PDSCH transmission).

The DCI may be transmitted to the UE via, for example, PDCCH. The UE receives the DCI and extracts various fields from it. By means of the TCI state identification fields indicating multiple beams in the DCI, the UE can find the source reference signals (such as NZP-CSI-RSs or SSBs) for which "QCL-TypeD" is set, and determine the receiving beams that receive these source reference signals, and with the quasi co-location relationship between the source reference signal and the DM-RS of PDSCH, the receiving parameters (receiving beams) for monitoring the PDSCH are determined.

5) Multi-Beam Indication Example 5

Figure 14:
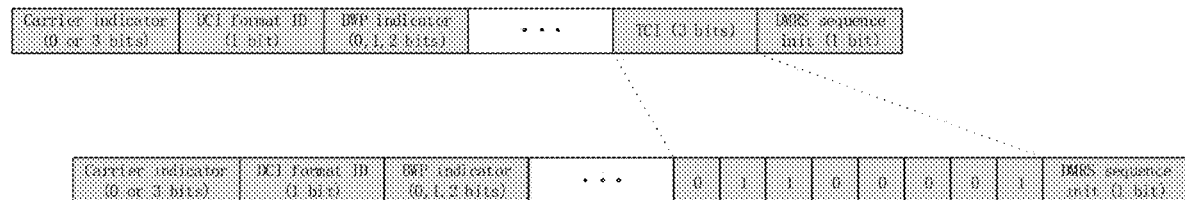
FIG. 14 illustrates an example of DCI for specifying TCI states according to multi-beam indication example 5.

The multi-beam indication example 5 according to the present disclosure is described with reference to FIG. 14. FIG. 14 is a new format of DCI that can be used to specify the TCI states, in which the upper is DCI for the traditional single-beam indication, and the lower is DCI that can be used the for the multi-beam indication example 5 of the present disclosure.

As shown in FIG. 14, identification information of the TCI states associated with multiple beams is encoded, for example, into a bitmap to reduce the amount of data transmission. The bitmap can include 8 bits, and corresponds to at most 8 TCI states activated by MAC CE in case where the number of TCI states configured by RRC is M>8, or corresponds to the configured M TCI states, respectively, in case where the number of TCI states configured by RRC is M≤8. In the bitmap, if the value of a certain bit is set to "1", it means that the TCI state corresponding to the bit is specified, otherwise it means that the TCI state corresponding to the bit is not specified.

The DCI may be sent to the UE via, for example, PDCCH. The UE receives the DCI and extracts various fields from it. By means of the bitmap in the DCI, the UE can determine which TCI states are specified, and find from the TCI states the source reference signals (such as NZP-CSI-RSs or SSBs) for which "QCL-TypeD" is set, and determine receiving beams for receiving these sources reference signals, and with the quasi co-location relationship between the source reference signal and the DM-RS of PDSCH, the receiving parameters (receiving beam) for monitoring the PDSCH are determined.

6) Multi-Beam Indication Example 6

According to the multi-beam indication example 6 of the present disclosure, setting of the existing TCI state will be modified. As described above, the existing TCI state is only allowed to set one "QCL-TypeD" hypothesis to avoid ambiguity in the single beam indication.

However, in the multi-beam indication example 6 of the present disclosure, two or more beams can be indicated by allowing the TCI state to have two or more "QCL-TypeD" hypotheses.

Figure 15:
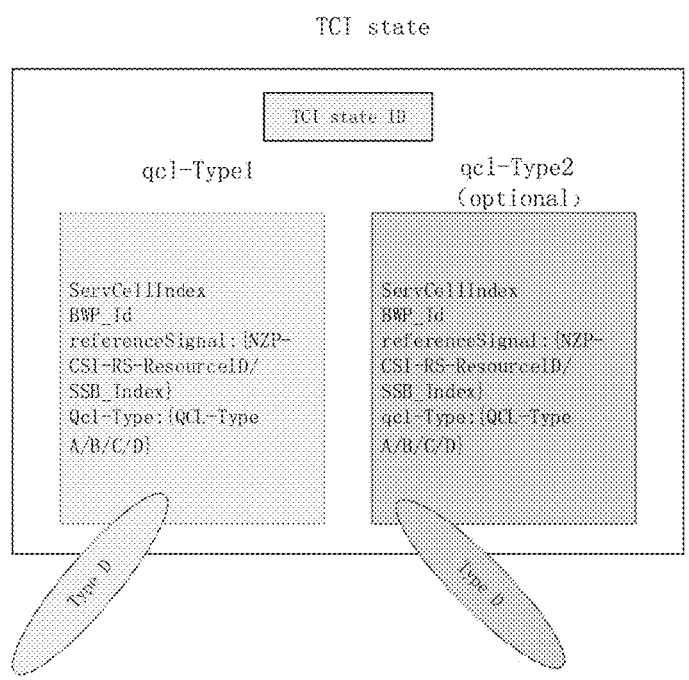
FIG. 15 illustrates a setting of TCI states according to multi-beam indication example 6.

FIG. 15 shows a modified setting of the TCI state. Different from the TCI state in FIG. 9, both of qcl-Type1 and qcl-Type2 in the TCI state in FIG. 15 can be set to "QCL-TypeD". The reference signal resources referenced by qcl-Type1 and qcl-Type2 are different, so they can be associated with two different beams, respectively. Although FIG. 15 only depicts the TCI state with two "QCL-TypeD" hypotheses, the present disclosure is not limited to this, and a TCI state including three or more "QCL-TypeD" hypotheses can be created.

By using the TCI state of the multi-beam indication example 6, the efficiency of indicating beams by the base station can be improved. For example, in case where the base station selects two beams for PDSCH transmission, the base station can include only one TCI state identification field in the DCI as in the traditional single beam indication, as shown in the DCI format in FIG. 13 or 14. The UE receives the DCI via, for example, PDCCH, extracts the TCI state identification field from it, and finds two source reference signals (such as NZP-CSI-RSs or SSBs) for which "QCL-TypeD" is set from the corresponding TCI state. Both of the two source reference signals have a quasi co-location relationship with the DM-RS of PDSCH, so that the UE can receive the PDSCH by using the receiving beams used previously to receive the two source reference signals. Of course, if the base station selects more than 2 beams, depending on the setting of the TCI state, the base station can specify more TCI states containing more "QCL-TypeD" hypotheses, or specify more TCI states containing two "QCL-TypeD" hypotheses. In one example, the TCI state including two "QCL-TypeD" hypotheses and the TCI state including one "QCL-TypeD" hypothesis can be mixed.

It should be note that such TCI state including two or more "QCL-TypeD" hypotheses is also applicable to PDCCH transmission. For example, as described in the above multi-beam indication example 1-3, the base station can indicate two or more associated beams to the UE by activating such TCI state by MAC CE.

7) Multi-Beam Indication Example 7

In the multi-beam indication example 7 according to the present disclosure, the base station indicates beams by sending an index of a combination of TCI states to the UE.

Figures 16, 17:
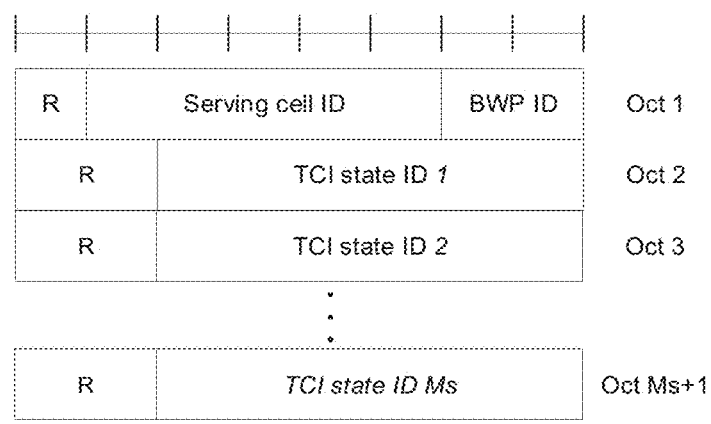
FIG. 16 illustrates an example of correspondence of TCI state combination and its index according to multi-beam indication example 7.
FIG. 17 illustrates an example of MAC CE for activating TCI states according to multi-beam indication example 8.

Specifically, for a different combination of TCI states, an index indicating this combination is set. As shown in FIG. 16, for 4 TCI states, 15 combinations of TCI states can be obtained, which can be represented by different indexes, respectively. The base station can inform the UE of the correspondence between the TCI state combination and the index via RRC configuration, or of the TCI state combinations and a method for generating the indexes so that the UE can find the corresponding TCI state combination based on the index.

After the base station determines one or more beams with, for example, the beam selection embodiment of the present disclosure, the base station determines the index of a combination of TCI states associated with the one or more beams. The base station may include the index in, for example, a reserved field of the DCI, a newly created field, or the TCI state identification field shown in FIG. 13, and send it to the UE. The UE extracts the index and finds the corresponding TCI state combination. By means of "QCL-TypeD" hypothesis of each of the TCI states in the TCI state combination, the UE can determine the receiving beams for receiving PDSCH.

8) Multi-Beam Indication Example 8

According to the existing NR standard R15, the base station configures a parameter tci-PresnetInDCI at the RRC layer to indicate whether the DCI contains a TCI state. If tci-PresnetInDCI is set to "0", the UE will know that the DCI received subsequently does not contain information on a TCI state. At this time, the base station will transmit the PDSCH by the TCI state (transmitting beam) which is activated by a MAC CE and is used for PDCCH scheduling PDSCH, that is, the TCI state activated by the MAC CE is used for both of PDCCH transmission and PDSCH transmission.

Based on such mechanism, the multi-beam indication example 8 of the present disclosure proposes a new mechanism for indicating the TCI state (transmitting beam) available for PDSCH transmission by MAC CE instead of by DCI.

Specifically, in the multi-beam indication example 8, an RRC parameter PresnetInMACCE is designed for use in conjunction with the PresnetInDCI parameter. In case where the PresnetInDCI parameter is "0", if the PresnetInMACCE parameter is turned on, for example, is set to "1", there is no TCI state specified for PDSCH transmission in the DCI, but the TCI state activated by MAC CE will be used for PDSCH transmission instead for PDCCH transmission.

FIG. 17 illustrates a MAC CE according to the multi-beam indication example 8 of the present disclosure. As shown in FIG. 17, the MAC CE includes an identification field of the TCI states associated with the selected Ms beams, but does not include a CORESET ID for PDCCH scheduling (since the transmission resources for the PDSCH are specified in PDCCH and there is no need to perform a blind detection in a CORSET resource set as PDCCH).

After receiving such MAC CE, the UE extracts the listed Ms TCI state IDs, and determines the receiving parameters (for example, receiving beams) based on the "QCL-TypeD" hypothesis in the corresponding TCI state. Since the PresnetInMACCE configured previously by RRC is turned on, the UE uses the determined receiving beams to monitor the PDSCH transmission.

The indication method of the multi-beam indication example 8 is also applicable to the single-beam operation, whereby the base station can indicate a single beam for PDSCH transmission by activating a single TCI state.

An exemplary description of beam operations of the present disclosure is given above. However, it should be noted that specific values given in the above description, such as the number of beams reported by the UE, the number of beams selected by the base station, the number of beams (TCI states) configured by RRC, the number of beams (TC states) activated by MAC CE, the number of beams (TCI states) specified in the DCI, etc., are illustrative and non-limiting, and changes in these values do not affect the idea of the technical solution of the present disclosure.

In addition, the above description is given in the context of beam scanning in the downlink direction. It should be noted that one or more aspects of the present disclosure are also applicable to beam scanning in the uplink direction.

[Electronic Device and Communication Method of the Present Disclosure]

Next, electronic devices and communication methods that can implement embodiments of the present disclosure are described.

Figure 18A:
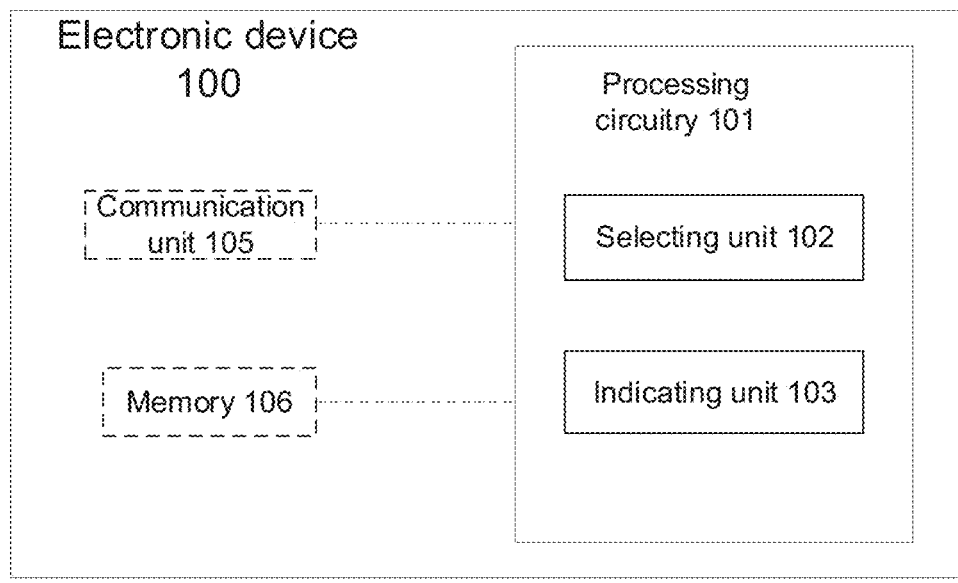
FIGS. 18A-18B illustrate an electronic device on base station side and a communication method thereof according to the present disclosure.

FIG. 18A is a block diagram illustrating an electronic device 100 according to the present disclosure. The electronic device 100 may be a control device such as a base station, or located in a control device such as a base station.

Figure 18B:
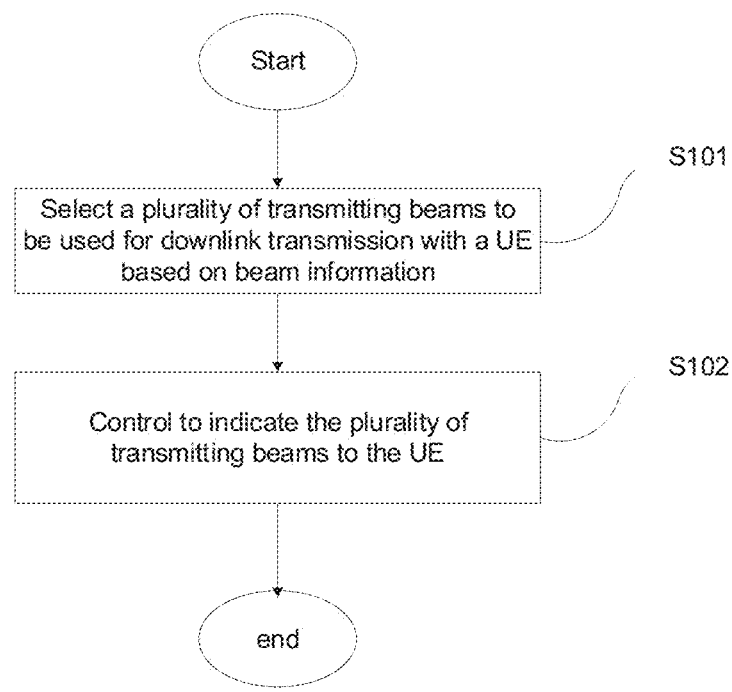

As shown in FIG. 18, the electronic device 100 includes a processing circuitry 101. The processing circuitry 101 includes at least a selecting unit 102 and an indicating unit 103. The processing circuitry 101 may be configured to execute the communication method shown in FIG. 18B. The processing circuitry 101 may refer to various implementations of a digital circuit system, an analog circuit system, or a hybrid signal (combination of analog signal and digital signal) circuit system that performs functions in a computing system. The processing circuitry may include, for example, a circuit such as an integrated circuit (IC), an application-specific integrated circuit (ASIC), a part or circuit of a single processor core, an entire processor core, a single processor, a programmable hardware device such as a field programmable array (FPGA), and/or a system including multiple processors.

The selecting unit 102 in the processing circuitry 101 is configured to select a plurality of transmitting beams for downlink transmission with a UE based on beam information reported by the UE, that is, to perform step S101 in FIG. 18B. In an example, the selecting unit 103 may select a plurality of transmitting beams according to a beam reporting mode of the UE. When the UE is configured to utilize a group-based beam reporting mode, the selection unit 103 may select a plurality of transmitting beams from a set of transmitting beams reported by the UE to be used for downlink transmission such as PDCCH or PDSCH. When the UE is configured to utilize a non-group-based beam reporting mode, the selecting unit 103 may be restricted to select one transmitting beam. In another example, for example, when the UE is configured to utilize a non-group-based beam reporting mode, the selecting unit 103 may also select a plurality of mutually compatible transmitting beams based on information of compatibility between beams.

The indicating unit 103 is configured to indicate the selected plurality of transmitting beams to the UE, that is, to perform step S102 in FIG. 18B. The indicating unit 103 may use the multi-beam indicating method in the above-described multi-beam indicating examples 1-8 or other beam indicating method. The indicating unit 103 may generate a MAC CE or DCI including identification information of the plurality of transmitting beams, and control to send the MAC CE or DCI to the UE, thereby indicating the plurality of transmitting beams to the UE. The UE will determine receiving beams that achieves the optimal reception for these multiple transmitting beams for purpose of receiving PDSCH or PDCCH.

The electronic device 100 may further include, for example, a communication unit 105 and a memory 106.

The communication unit 105 may be configured to communicate with the UE under the control of the processing circuitry 101. In an example, the communication unit 105 may be implemented as a transmitter or transceiver, including communication components such as antenna arrays and/or radio frequency links. The communication unit 105 is drawn with a dashed line because it can also be located outside the electronic device 100. The communication unit 105 may receiving beam measurement information and/or beam compatibility information, etc., from the UE, for reference by the selecting unit 102. The communication unit 105 may also send the MAC CE or DCI generated by the indicating unit 103 to indicate the plurality of transmitting beams.

The electronic device 100 may further include a memory 106. The memory 106 may store various data and instructions, such as beam information and/or compatibility information received from the UE, programs and data for the operation of the electronic device 100, various data generated by the processing circuitry 101, data to be transmitted by the communication unit 105, and so on. The memory 106 is drawn with a dashed line because it can also be located in the processing circuitry 101 or located outside the electronic device 100. The memory 106 may be a volatile memory and/or a non-volatile memory. For example, the memory 202 may include, but is not limited to, random access memory (RAM), dynamic random access memory (DRAM), static random access memory (SRAM), read only memory (ROM), and flash memory.

Figure 19A:
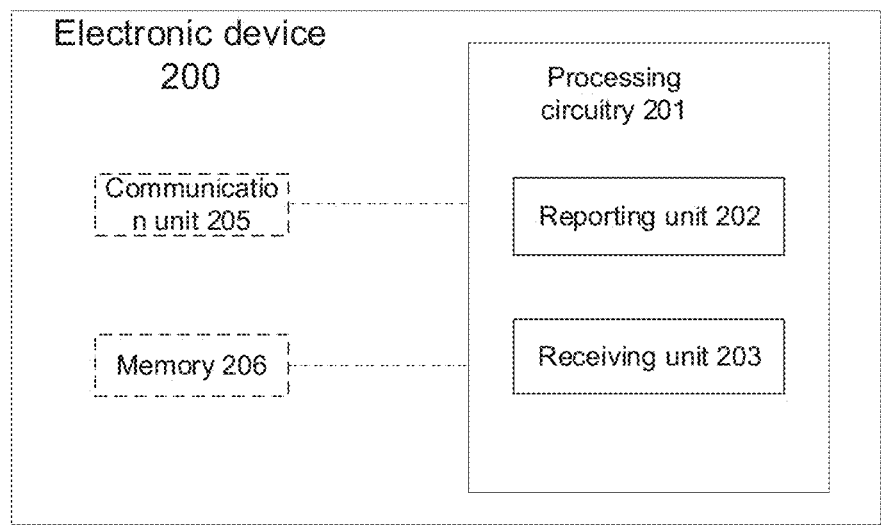
FIGS. 19A-19B illustrate an electronic device on UE side and a communication method thereof according to the present disclosure.

FIG. 19A is a block diagram illustrating an electronic device 200 according to the present disclosure. The electronic device 200 may be a UE or a component of the UE.

As shown in FIG. 19A, the electronic device 200 includes a processing circuitry 201. The processing circuitry 201 at least includes a reporting unit 202 and a receiving unit 203. The processing circuitry 201 may be configured to execute the communication method shown in FIG. 19B. The processing circuitry 201 may refer to various implementations of a digital circuit system, an analog circuit system, or a hybrid signal (combination of analog signal and digital signal) circuit system that performs functions in a computing system. The processing circuitry may include, for example, a circuit such as an integrated circuit (IC), an application specific integrated circuit (ASIC), a part or circuit of a single processor core, an entire processor core, a single processor, a programmable hardware device such as a field programmable array (FPGA), and/or a system including multiple processors.

Figure 19B:
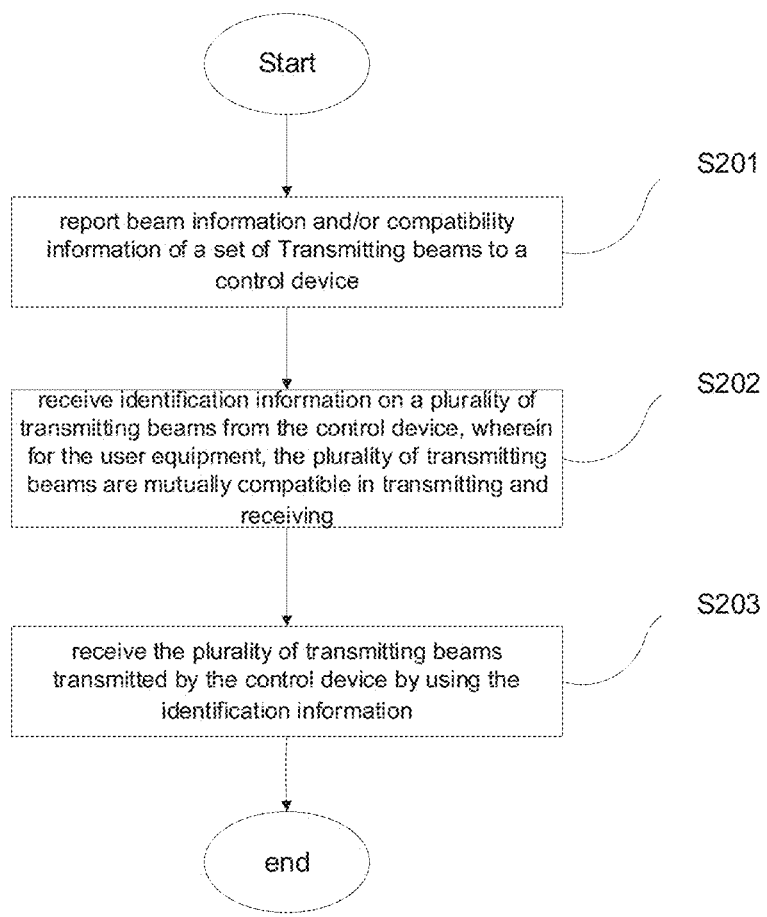

The reporting unit 202 of the processing circuitry 201 is configured to report beam information of a set of transmitting beams to a base station, that is, to perform step S201 in FIG. 19B. The reporting unit 202 may be configured to utilize any of a group-based beam reporting mode and a non-group-based beam reporting mode. The reporting unit 202 may generate a beam report containing measurements (for example, L1-RSRP, L1-RSRQ, L1-SINR, etc.) of the beams and identification information of the beams. In an example, the reporting unit 202 may also obtain information on receiving compatibility between the beams, and send it together with or separately from the beam report.

The receiving unit 203 is configured to receive the identification information about a plurality of transmitting beams from the base station, that is, to perform step S202 in FIG. 19B. Wherein for the UE, the plurality of transmitting beams are mutually compatible in transmitting and receiving. The identification information may be IDs of TCI states associated with the transmitting beams, where the TCI state provides quasi co-location information related to a transmitting beam. The identification information can be included in MAC CE or DCI.

The processing circuitry 201 may also determine, based on the identification information on the plurality of transmitting beams received by the receiving unit 203, receiving beams that previously achieved the optimal reception for the plurality of transmitting beams for purpose of receiving the subsequent PDSCH or PDCCH.

The electronic device 200 may further include, for example, a communication unit 205 and a memory 206.

The communication unit 205 may be configured to communicate with the base station under the control of the processing circuitry 201. In an example, the communication unit 205 may be implemented as a transmitter or transceiver, including communication components such as antenna arrays and/or radio frequency links. The communication unit 205 is drawn with a dotted line because it can also be located outside the electronic device 200. The communication unit 205 may transmit the beam measurement information and/or beam compatibility information, etc., to the base station for use by the base station. The communication unit 205 may also receive MAC CE or DCI for indicating the plurality of transmitting beams from the base station.

The electronic device 200 may further include a memory 206. The memory 206 can store various data and instructions, such as programs and data used for the operation of the electronic device 200, various data generated by the processing circuitry 201, various control signaling or service data received by the communication unit 205, the beam information and/or compatibility information to be transmitted by the communication unit 205. The memory 206 is drawn with a dashed line because it can also be located in the processing circuitry 201 or outside the electronic device 200. The memory 206 may be a volatile memory and/or a non-volatile memory. For example, the memory 202 may include, but is not limited to, random access memory (RAM), dynamic random access memory (DRAM), static random access memory (SRAM), read only memory (ROM), and flash memory.

Next, signaling flows of the beam operation according to the present disclosure will be described in detail with reference to FIGS. 20A-20C.

Figure 20A:
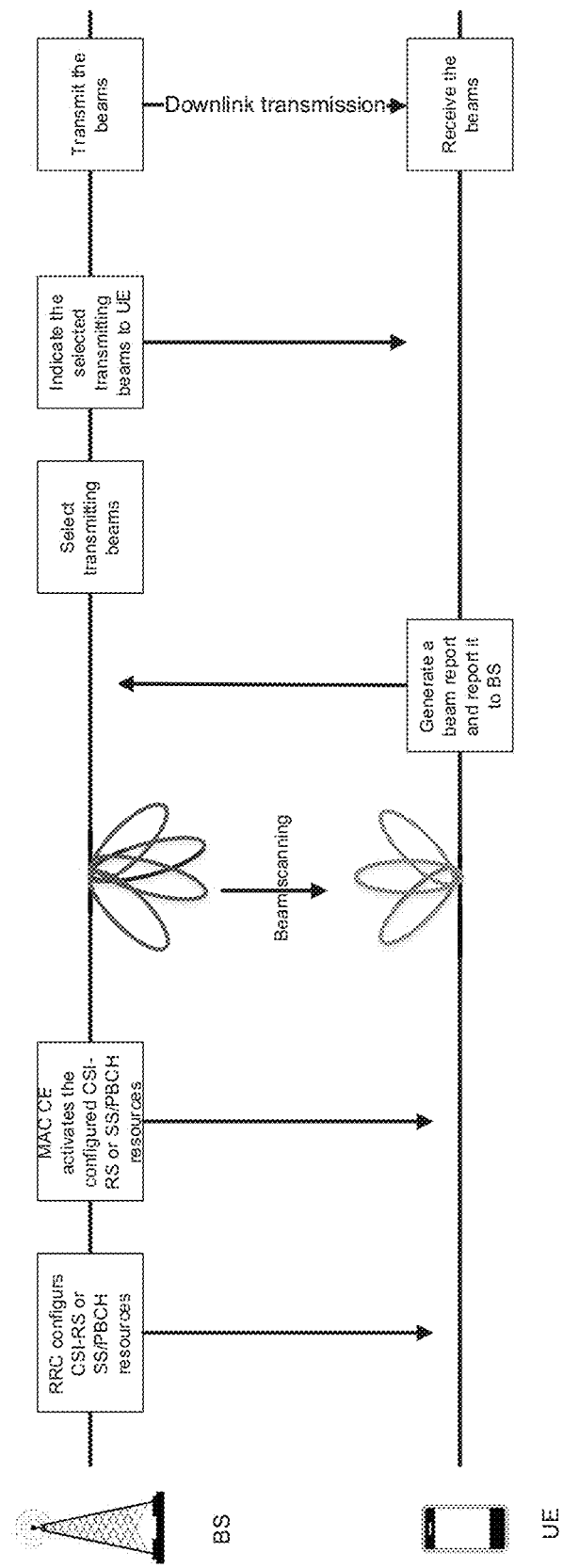
FIGS. 20A-20C illustrate signaling flows of beam operation according to the present disclosure.

FIG. 20A shows an example of a signaling flow of beam operation according to the present disclosure. As shown in FIG. 20A, first, the base station configures, at the RRC layer, the UE with transmission resources for beam scanning, such as non-zero power CSI-RS (NZP-CSI-RS) resources or synchronization signal/physical broadcast channel (SS/PBCH) block resources. For example, in the NR communication system, the RRC in gNB or ng-eNB can configure the reference signal resources for the UE by configuring the CSI-ResourceConfig information element, the NZP-CSI-RS-ResourceSet or the CSI-SSB-ResourceSet information element. The configuration information on the reference signal resources may be transmitted to the UE via, for example, PDSCH or PBCH. The UE receives the configuration information of these reference signal resources and stores it in the memory of the UE.

Then, the base station activates, at the MAC layer, a set of reference signal resources for the UE. The activation or deactivation of the reference signal resource can be performed by processing MAC control element (MAC CE) in a MAC packet. For example, in the NR communication system, the base station activates a CSI-RS resource set by sending an activation/deactivation MAC CE for a semi-static CSI-RS/CSI-IM resource set. The MAC CE includes:

A/D field indicating whether the MAC CE is used to activate or deactivate the indicated a semi-static CSI-RS resource set. This field is set to "1" for activation, and "0" for deactivation;

Serving Cell ID field indicating ID of a serving cell to which this MAC CE applies, and its length is 5 bits;

BWP ID field containing BWP-Id of a downlink bandwidth part to which this MAC CE applies, and its length is 2 bits;

SP CSI-RS resource set ID field containing an index of an NZP-CSI-RS-ResourceSet, which indicates the NZP-CSI-RS resource in the semi-static NZP-CSI-RS resource set that should be activated or deactivated, and has a length of 6 bits.

After the UE receives the MAC CE in a MAC packet, it decodes each of the fields, and the UE can be aware that the NZP-CSI-RS resources in the semi-static NZP-CSI-RS resource set indicated by the SP CSI-RS resource set ID has been activated for the UE.

Next, the base station performs the beam scanning process for a set of candidate transmitting beams by using the activated reference signal resources. The base station can generally complete the transmission of all candidate transmitting beams in 5 time slots.

In an example, for purpose of quick beam alignment, the base station can adopt a staged scanning strategy, that is, scanning from wide to narrow. The first stage is a coarse scanning. The base station uses a small number of wide beams to cover the entire cell and sequentially scans the directions in which each of the wide beams is aligned. The accuracy of alignment of the wide beam is not high, and the established wireless communication connection has a relatively limited quality. The base station determines which wide beam coverage the UE falls in based on a report from the UE. The second stage is a fine scanning. The base station uses multiple narrow beams to scan individual directions covered by the wide beam in the first stage. For a single UE, although the scanning beam becomes narrower at this time, the required scanning range has been reduced, and the number of scannings is reduced accordingly. On the basis of the alignment of wide beams in the first stage, the base station only needs to continue finely scanning the narrow beams related to a wide beam. At this time, the base station improves the accuracy of aiming the beam direction at each user, and the established wireless communication connection has an improved quality. Therefore, compared with the single-stage beam scanning, the number of scannings for each UE by the base station is greatly reduced in two-stage beam scanning, thereby accelerating the beam scanning and saving system resources.

The UE uses a set of candidate receiving beams to receive the downlink reference signals, and measures reference signal received power (L1-RSRP), reference signal received quality (L1-RSRQ), signal to interference plus noise ratio (L1-SINR) etc. The UE may also determine the receiving compatibility between beams based on the receptions of the beams.

The UE selects reference signals to be reported according to the group-based beam reporting mode or the non-group-based beam reporting mode, and generates a CSI report containing indicators of several reference signals and the measurement values. The UE may also include the receiving compatibility information in the CSI report, for example, according to any of the methods in FIGS. 8A, 8B and 8C.

The UE sends the CSI report to the base station via PUSCH or PUCCH.

Based on the CSI report received from the UE, the base station selects one or more transmitting beams with a beam selection strategy. In an example, the base station selects one or more transmitting beams according to the beam reporting mode of the UE. In another example, the base station selects one or more transmitting beams according to the compatibility information of the beams.

Then, the base station transmits TCI states of the selected one or more transmitting beams to the UE by MAC CE or DCI. The base station can use the traditional single-beam indication mechanism to indicate a single beam, or can use the above multi-beam indication mechanism to indicate multiple beams, and its description will not be repeated here.

After the beam indication takes effect, the base station uses the selected one or more transmitting beams to transmit PDCCH or PDSCH. On the UE side, the UE assumes that the port of the PDCCH or PDSCH and the port of the source reference signal resource in the TCI state have a quasi co-location relationship, and that the same transmitting beam is used, so the UE will monitor and monitor the PDCCH or PDSCH by using the receiving parameters for receiving the source reference signal previously.

Figure 20B:
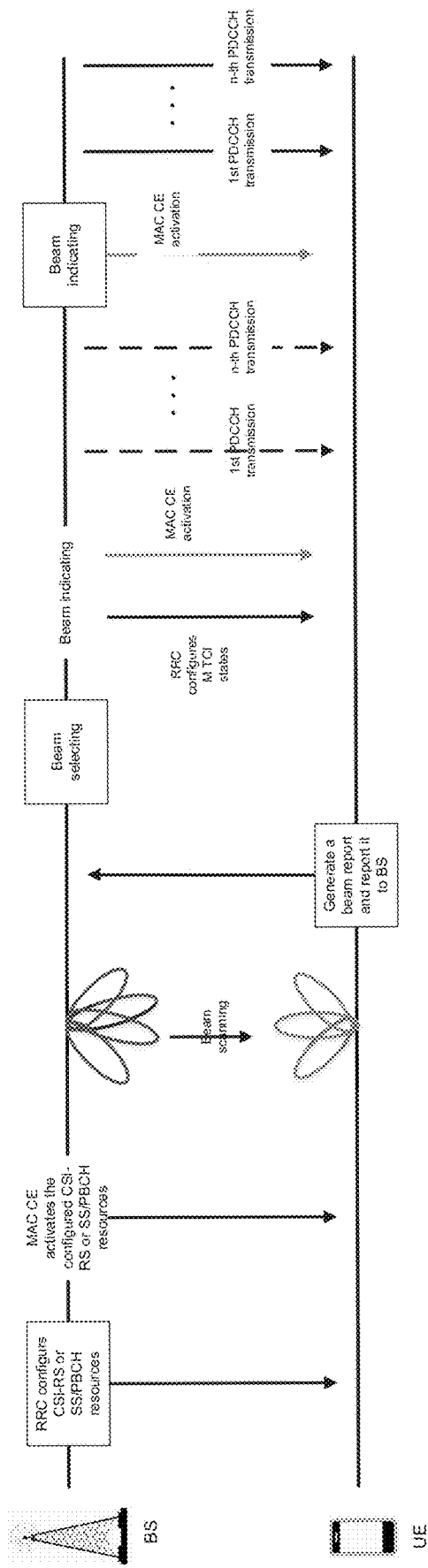

FIG. 20B shows another example of a signaling flow of beam operation according to the present disclosure. The processes such as beam scanning, beam measurement, beam reporting, and beam selecting in FIG. 20B are the same as those in FIG. 20A and will not be described repeatedly.

As shown in FIG. 20B, after the base station has selected a plurality of transmitting beams to be used for downlink transmission, the base station indicates the selected transmitting beams to the UE through a beam indication process. First, the base station configures M (the upper limit of M is for example 64) TCI states for the UE at the RRC layer; then, the base station activates a plurality of TCI states corresponding to the selected plurality of transmitting beams in the MAC CE, thereby indicating the transmitting beams. For example, the MAC CE illustrated in FIGS. 10 and 11 can be used to activate the beams.

After the activation by the MAC CE takes effect, the base station can use the indicated plurality of transmitting beams to perform downlink PDCCH transmission. For the UE, the UE obtains identification information of the transmitting beams, such as the TCI state IDs, from the MAC CE, and can determine the spatial receiving parameters (receiving beams) for monitoring the PDCCH, and receives the PDCCH using the determined plurality of receiving beams. The base station and the UE always use these transmitting beam-receiving beam pairs for downlink PDCCH transmission until the base station activates and indicates a new set of transmitting beams by MAC CE.

In order to adapt to channel conditions and transmission needs, the base station can change the transmitting beam used for downlink transmission. For example, the base station can reselect one or more transmitting beams and re-indicate the beams by transmitting a new MAC CE. At this time, the base station does not need to configure the RRC layer again, unless the base station wants to use a beam that has not been configured before. The base station generates a MAC CE containing the TCI state corresponding to the newly selected transmitting beam and transmits it to the UE. After receiving and decoding the MAC CE, the UE will re-determine the corresponding one or more receiving beams to be used for the subsequent PDCCH reception.

The base station can send different MAC CEs to the UE multiple times during one RRC configuration, thereby realizing beam switching.

Figure 20C:
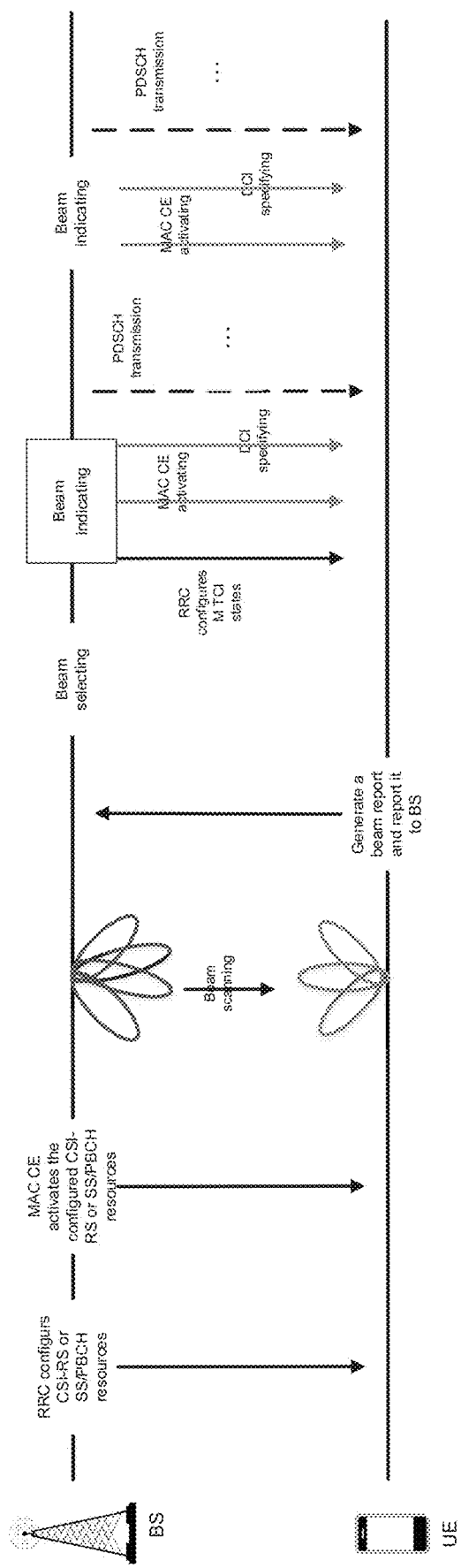

FIG. 20C is another example showing a signaling flow of beam operation according to the present disclosure. The processes of beam scanning, beam measurement, beam reporting, beam selection, etc. in FIG. 20C are the same as those in FIG. 20A, and the description will not be repeated.

As shown in FIG. 20C, after the base station has selected a plurality of transmitting beams to be used for downlink transmission, the base station indicates the selected transmitting beams to the UE through a beam indication process. First, the base station configures M (the upper limit of M is, for example, 64) TCI states for the UE at the RRC layer; then, the base station activates a plurality of TCI states, for example, at most 8 TCI states, in the MAC CE. Finally, the base station specifies the TCI state IDs corresponding to the plurality of transmitting beams to be used for PDSCH transmission in the DCI for scheduling the PDSCH, so as to indicate the transmitting beams to the UE.

The UE receives the DCI and extracts various fields, in which the field related to the TCI states can be used to determine the receiving beams. The UE receives the PDSCH transmission using the determined receiving beams.

Since one piece of DCI only schedules one PDSCH transmission, the base station must send DCI to the UE before each PDSCH transmission.

For each PDSCH transmission, the DCI sent by the base station can independently specify the transmitting beam. In other words, the transmitting beam (TCI state) specified by the base station for the next one PDSCH transmission can be the same as or different from the transmitting beam of the current PDSCH transmission, but these transmitting beams are all those that have been activated by a MAC CE. In case where the base station specifies a different transmitting beam in the DCI than this time, the base station and the UE will change the corresponding transmitting beam and receiving beam in the next PDSCH transmission.

The base station may also activate a set of (for example, at most 8) new transmitting beams by sending a new MAC CE. Then, the base station sends DCI to specify which one or ones of the new transmitting beams will be used for PDSCH transmission.

As illustrated in FIG. 20C, the base station may send different MAC CEs multiple times during one RRC configuration. In addition, it may also send DCI multiple times during one MAC CE activation to schedule multiple PDSCH transmissions.

The various aspects of the embodiments of the present disclosure have been described in detail above, but it should be noted that structure, arrangement, type, number and the like of the antenna array, ports, reference signals, communication devices, communication methods and so on are illustrated above for purpose of description, but it is not intended to limit aspects of the present disclosure to these specific examples.

It should be understood that the units of the electronic devices 100 and 200 described in the foregoing embodiments are only logical modules divided according to the specific functions implemented by them, and are not intended to limit specific implementations. In actual implementation, the foregoing units may be implemented as independent physical entities, or may also be implemented by a single entity (for example, a processor (CPU or DSP, etc.), integrated circuit, etc.).

[Exemplary Implementations of the Present Disclosure]

According to the embodiment of the present disclosure, various implementations that embody the concepts of the present disclosure are conceivable, including but not limited to:

1). An electronic device on side of control device, comprising:
a processing circuitry configured to:
select one or more transmitting beams to be used for downlink transmission with a user equipment based on beam information reported by the user equipment; and
control to indicate the one or more transmitting beams to the user equipment,
wherein the processing circuitry is configured to perform the selecting of transmitting beams according to a beam reporting mode of the user equipment, and to select a plurality of transmitting beams in case where the user equipment reports the beam information in a group-based beam reporting mode.

2). The electronic device of 1), wherein the processing circuitry is configured to select a single transmitting beam in case where the user equipment reports the beam information in a non-group-based beam reporting mode.

3). An electronic device on side of control device, comprising:
a processing circuitry configured to:
select a plurality of transmitting beams to be used for downlink transmission with a user equipment from a set of transmitting beams based on beam information reported by the user equipment; and
control to indicate the plurality of transmitting beams to the user equipment,
wherein for the user equipment, the plurality of transmitting beams are mutually compatible in transmitting and receiving.

4). The electronic device of 3), further comprising:
acquiring compatibility information about the set of transmitting beams; and
selecting the plurality of transmitting beams which are mutually compatible, based on the compatibility information.

5). The electronic device of 4), wherein the compatibility information includes transmitting compatibility information obtained from the control device indicating whether the set of transmitting beams can be transmitted simultaneously.

6). The electronic device of 4), wherein the compatibility information includes receiving compatibility information obtained from the user equipment indicating whether the set of transmitting beams can be received simultaneously by the user equipment.

7). The electronic device of 6), wherein the receiving compatibility information is a binary indication as to whether all of the set of transmitting beams can be received simultaneously.

8). The electronic device of 6), wherein the receiving compatibility information includes a mark for each of the set of transmitting beams, and wherein the processing circuitry determines transmitting beams that can be received simultaneously by the user equipment based on the mark.

9). The electronic device of 6), wherein the compatibility information includes information received from the user equipment for one or more subsets of the set of transmitting beams, wherein the transmitting beams in each subset can be received simultaneously by the user equipment.

10). The electronic device of any of 6)-9), wherein the receiving compatibility information is included in a beam report sent by the user equipment together with the beam information.

11). The electronic device of 3), wherein the beam information includes at least one of reference signal received power (RSRP), reference signal received quality (RSRQ), signal to interference plus noise ratio (SINK).

12). The electronic device of 3), wherein the processing circuitry controlling to indicate the plurality of transmitting beams to the user equipment comprises:
generating a medium access control (MAC) control element (CE) containing identification information associated with the plurality of transmitting beams;
controlling to send the MAC CE to the user equipment so as to activate the plurality of transmitting beams.

13). The electronic device of 12), wherein the processing circuitry includes identification information associated with the plurality of transmitting beams in a single MAC CE.

14). The electronic device of 12), wherein the processing circuitry is further configured to:
activate transmitting beams to be used in multiple downlink transmissions for the same content by using a predetermined number of MAC CEs, wherein each of the MAC CEs corresponds to one of the downlink transmissions and contains identification information associated with at least one transmitting beam to be used in the downlink transmission.

15). The electronic device of 12), wherein the processing circuitry is further configured to:
activate transmitting beams to be used in multiple downlink transmissions for the same content by using a predetermined number of MAC CEs, wherein each of the MAC CEs corresponds to one of the downlink transmissions and contains identification information associated with at least one transmitting beam to be used in the downlink transmission;
control to perform the downlink transmissions for the same content in sequence;
receive an acknowledgement message for a downlink transmission from the user equipment;
terminate the downlink transmissions for the same content in case where the acknowledgement message indicates that the downlink transmission is successful.

16). The electronic device of 3), wherein the processing circuitry controlling to indicate the plurality of transmitting beams to the user equipment comprises:
including identification information associated with the plurality of transmitting beams in Downlink Control Information (DCI);
controlling to send the DCI to the user equipment.

17). The electronic device of 16), wherein the DCI includes a plurality of fields associated with the plurality of transmitting beams, and each of the fields contains identification information associated with respective one of the transmitting beams.

18). The electronic device of 16), wherein the DCI includes a single field associated with the plurality of transmitting beams, and the identification information of the plurality of transmitting beams is encoded into the field.

19). The electronic device of 18), wherein the field is a bitmap, and corresponding bits of the plurality of transmitting beams in the bitmap are set to indicate enablement of the plurality of transmitting beams.

20). The electronic device of 12) or 16), wherein the identification information is a transmission configuration indicator (TCI) state ID.

21). The electronic device of 20), wherein each TCI state ID is configured to indicate two or more transmitting beams.

22). The electronic device of 12) or 16), wherein the identification information includes an index to at least one transmission configuration indicator (TCI) state.

23). The electronic device of any of 12)-15), wherein the plurality of transmitting beams are used for transmission of physical downlink control channel (PDCCH).

24). The electronic device of any of 16)-19), wherein the plurality of transmitting beams are used for transmission of physical downlink shared channel (PDSCH).

25). The electronic device of 12), wherein the processing circuitry is further configured to:
configure a radio resource control (RRC) layer parameter tci-PresentInMACCE for the user equipment; and
perform transmission of physical downlink shared channel (PDSCH) by using the plurality of transmitting beams in case where the parameter tci-PresentInMACCE is turned on.

26). The electronic device of 1) or 3), wherein the electronic device is a base station and includes a plurality of antenna arrays, and the plurality of transmitting beams respectively correspond to different antenna arrays, and wherein the processing circuitry is further configured to control corresponding antenna arrays to transmit the plurality of transmitting beams simultaneously to the user equipment.

27). An electronic device on side of user equipment comprising:
a processing circuitry configured to:
report beam information to a control device in a group-based beam reporting mode;
receive identification information on a plurality of beams from the control device; and
receive the plurality of beams transmitted by the control device by using the identification information.

28). An electronic device on side of user equipment comprising:
a processing circuitry configured to
report beam information and compatibility information of a set of beams to a control device;
receive identification information on a plurality of beams from the control device, wherein for the user equipment, the plurality of beams are mutually compatible in transmitting and receiving; and
receive the plurality of beams transmitted by the control device by using the identification information.

29). The electronic device of 27) or 28), wherein the electronic device is a user equipment and includes a plurality of antenna arrays, and the processing circuitry is further configured to use corresponding one or more of the plurality of antenna arrays to receive the plurality of beams simultaneously.

30). The electronic device of 27) or 28), wherein the identification information is included in a medium access control (MAC) control element (CE).

31). The electronic device of 27) or 28), wherein the identification information is included in Downlink Control Information (DCI).

32). The electronic device of 28), wherein the processing circuitry is further configured to measure the beam information of the set of beams, and report the beam information to the control device together with the compatibility information.

33). A communication method, comprising:
selecting one or more transmitting beams to be used for downlink transmission with a user equipment based on beam information reported by the user equipment; and
controlling to indicate the one or more transmitting beams to the user equipment,
wherein the processing circuitry is configured to perform the selecting of transmitting beams according to a beam reporting mode of the user equipment, and to select a plurality of transmitting beams in case where the user equipment reports the beam information in a group-based beam reporting mode.

34). A communication method, comprising:
selecting a plurality of transmitting beams to be used for downlink transmission with a user equipment from a set of transmitting beams based on beam information reported by the user equipment; and
controlling to indicate the plurality of transmitting beams to the user equipment,
wherein for the user equipment, the plurality of transmitting beams are mutually compatible in transmitting and receiving.

35). A communication method, comprising:
reporting beam information to a control device in a group-based beam reporting mode;
receiving identification information on a plurality of beams from the control device; and
receiving the plurality of beams transmitted by the control device by using the identification information.

36). A communication method, comprising:
reporting beam information and compatibility information of a set of beams to a control device;
receiving identification information on a plurality of beams from the control device, wherein for the user equipment, the plurality of beams are mutually compatible in transmitting and receiving; and
receiving the plurality of beams transmitted by the control device by using the identification information.

37). A non-transitory computer readable storage medium storing executable instructions which, when executed, implement the communication method of any of 33) to 36).

Application Examples of the Present Disclosure

The technology described in the present disclosure can be applied to various products.

For example, the electronic device 100 according to the embodiments of the present disclosure may be implemented as various base stations or installed in various base stations, and the electronic device 200 may be implemented as various terminal devices or installed in various terminal devices.

The communication method according to the embodiments of the present disclosure may be implemented by various base stations or user equipments; and the methods and operations according to the embodiments of the present disclosure can be embodied as computer-executable instructions, stored in a non-transitory computer-readable storage medium, and can be executed by various base stations or user equipment to implement one or more of the functions as described above.

The technology according to the embodiments of the present disclosure can be made into various computer program products and used in various base stations or user equipments to implement one or more of the functions as described above.

The base station as described in the present disclosure may be implemented as any type of base stations, preferably, such as the macro gNB or ng-eNB as defined in the 3GPP 5G NR standard. A gNB may be a gNB that covers a cell smaller than a macro cell, such as a pico gNB, micro gNB, and home (femto) gNB. Instead, the base station may be implemented as any other types of base stations such as a NodeB, eNodeB and a base transceiver station (BTS). The base station may include a main body configured to control wireless communication, and one or more remote radio heads (RRH), a wireless relay, a drone control tower, a control node in an automation factory or the like disposed in a different place from the main body.

The user equipment may be implemented as a mobile terminal such as a smartphone, a tablet personal computer (PC), a notebook PC, a portable game terminal, a portable/dongle type mobile router, and a digital camera apparatus, or an in-vehicle terminal such as a vehicle navigation device. The user equipment may also be implemented as a terminal (that is also referred to as a machine type communication (MTC) terminal) that performs machine-to-machine (M2M) communication, a drone, a sensor or actuator in an automated factory or the like. Furthermore, the user equipment may be a wireless communication module (such as an integrated circuit module including a single die) mounted on each of the above terminals.

Examples of the base station and the user equipment to which the technology of the present disclosure can be applied may be briefly introduced below.

It will be appreciated that as used in the present disclosure, the term "base station" has the full breadth in its generic sense, and includes at least a wireless communication station used as a portion of a wireless communication system or a radio system for purpose of communication. Examples of the base station can be for example but is not limited to the following: either or both of the base transceiver station (BTS) and the base station controller (BSC) in the GSM system; either or both of the radio network controller (RNC) or NodeB in the 3G communication system; eNB in the LTE and LTE-Advanced system; gNB and ng-eNB in the 5G communication system. In communication scenarios such as D2D, M2M and V2V, a logical entity having a control function over the communication can be referred to as a base station. In the scenario of cognitive radio communication, a logical entity having a function of frequency spectrum coordination can also be referred to a base station.

First Application Example of Base Station

Figure 21:
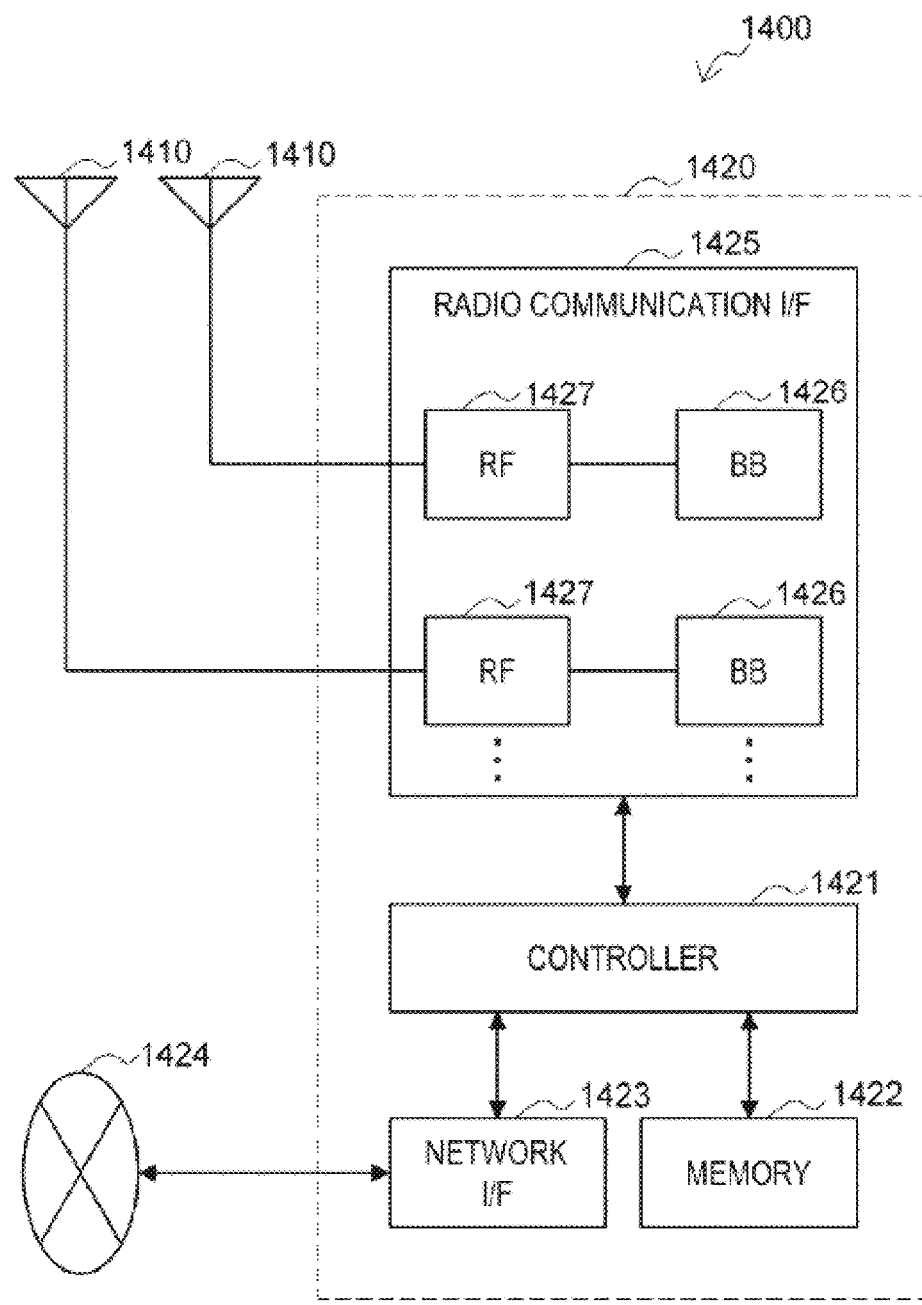
FIG. 21 illustrates a first example of exemplary configuration of the control device according to an embodiment of the present disclosure.

FIG. 21 is a block diagram showing a first example of a schematic configuration of a base station to which the technology of the present disclosure can be applied. In FIG. 21, the base station can be implemented as gNB 1400. The gNB 1400 includes a plurality of antennas 1410 and a base station device 1420. The base station device 1420 and each antenna 1410 may be connected to each other via an RF cable. In one implementation, the gNB 1400 (or base station device 1420) herein may correspond to the electronic devices 300A, 1300A, and/or 1500B described above.

The antennas 1410 includes multiple antenna elements, such as multiple antenna arrays for the large-scale MIMO. The antennas 1410, for example, may be arranged as the antenna array matrix as illustrated in FIG. 2A, and is used for the base station device 1420 to transmit and receive radio signals. For example, multiple antennas 1410 may be compatible with multiple frequency bands used by the gNB 1400.

The base station device 1420 includes a controller 1421, a memory 1422, a network interface 1423, and a radio communication interface 1425.

The controller 1421 may be, for example, a CPU or a DSP, and operates various functions of higher layers of the base station device 1420. For example, the controller 1421 may include the processing circuitry 101 as described above, perform the communication method as described in FIG. 18B, or control various components of the electronic device 100. For example, controller 1421 generates data packets from data in signals processed by the radio communication interface 1425, and transfers the generated packets via network interface 1423. The controller 1421 can bundle data from multiple baseband processors to generate the bundled packets, and transfer the generated bundled packets. The controller 1421 may have logic functions of performing control such as radio resource control, radio bearer control, mobility management, admission control, and scheduling. This control may be performed in corporation with a gNB or a core network node in the vicinity. The memory 1422 includes RAM and ROM, and stores a program that is executed by the controller 1421 and various types of control data such as a terminal list, transmission power data, and scheduling data.

The network interface 1423 is a communication interface for connecting the base station device 1420 to the core network 1424. Controller 1421 may communicate with a core network node or another gNB via the network interface 1423. In this case, the gNB 1400 and the core network node or other gNBs may be connected to each other through a logical interface such as an Si interface and an X2 interface. The network interface 1423 may also be a wired communication interface or a radio communication interface for radio backhaul lines. If the network interface 1423 is a radio communication interface, the network interface 1423 may use a higher frequency band for radio communication than a frequency band used by the radio communication interface 1425.

The radio communication interface 1425 supports any cellular communication schemes, such as 5G NR, and provides radio connection to a terminal positioned in a cell of the gNB 1400 via the antenna 1410. Radio communication interface 1425 may typically include, for example, a baseband (BB) processor 1426 and a RF circuit 1427. The BB processor 1426 may perform, for example, encoding/decoding, modulation/demodulation, and multiplexing/demultiplexing, and performs various types of signal processing of layers such as L1, Medium Access Control (MAC), Radio Link Control (RLC), and Packet Data Convergence Protocol (PDCP). Instead of controller 1421, the BB processor 1426 may have a part or all of the above-described logic functions. The BB processor 1426 may be a memory that stores a communication control program, or a module that includes a processor configured to execute the program and a related circuit. Updating the program may allow the functions of the BB processor 1426 to be changed. The module may be a card or a blade that is inserted into a slot of the base station device 1420. Alternatively, the module may also be a chip that is mounted on the card or the blade. Meanwhile, the RF circuit 1427 may include, for example, a mixer, a filter, and an amplifier, and transmits and receives radio signals via the antenna 1410. Although FIG. 21 shows an example in which one RF circuit 1427 is connected to one antenna 1410, the present disclosure is not limited to thereto; rather, one RF circuit 1427 may connect to a plurality of antennas 1410 at the same time.

As shown in FIG. 21, the radio communication interface 1425 may include the multiple BB processors 1426. For example, the multiple BB processors 1426 may be compatible with multiple frequency bands used by gNB 1400. As shown in FIG. 21, the radio communication interface 1425 may include the multiple RF circuits 1427. For example, the multiple RF circuits 1427 may be compatible with multiple antenna elements. Although FIG. 21 shows the example in which the radio communication interface 1425 includes the multiple BB processors 1426 and the multiple RF circuits 1427, the radio communication interface 1425 may also include a single BB processor 1426 or a single RF circuit 1427.

In the gNB 1400 shown in FIG. 21, one or more units (for example, the indicating unit 103) included in the processing circuitry 101 described with reference to FIG. 18A may be implemented in the wireless communication interface 825. Alternatively, at least a part of these components may be implemented in the controller 821. For example, the gNB 1400 includes a part (for example, the BB processor 1426) or entirety of the wireless communication interface 1425, and/or a module including the controller 1421, and one or more components may be implemented in the module. In this case, the module may store a program for allowing the processor to function as one or more components (in other words, a program for allowing the processor to perform operations of one or more components) and execute the program. As another example, a program for allowing the processor to function as one or more components may be installed in the gNB 1400, and the wireless communication interface 1425 (for example, the BB processor 1426) and/or the controller 1421 may execute the program. As described above, as an apparatus including one or more components, the gNB 1400, the base station device 1420, or a module may be provided, and a program for allowing the processor to function as one or more components may be provided. In addition, a readable medium in which the program is recorded may be provided.

Second Application Example of Base Station

Figure 22:
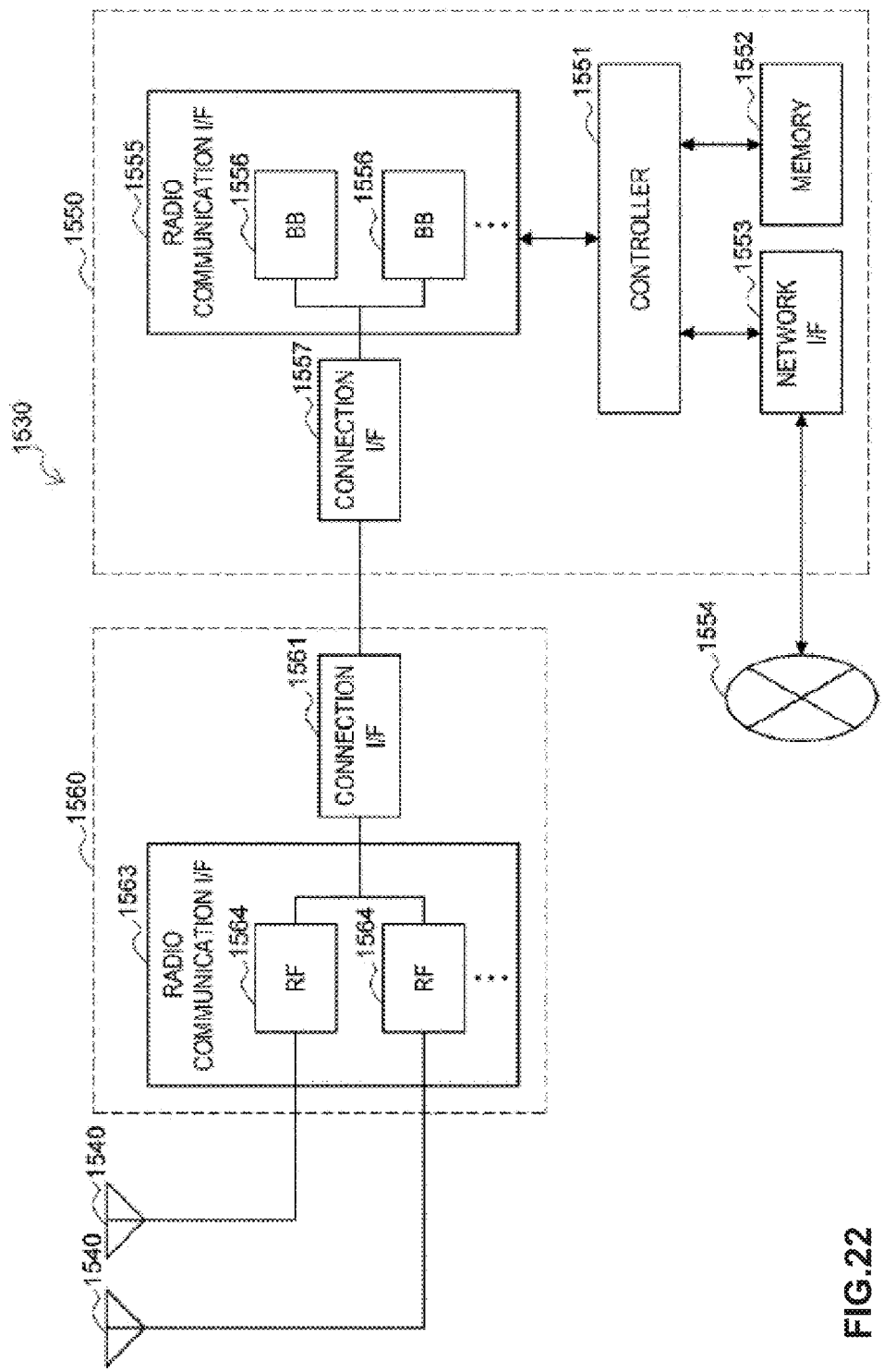
FIG. 22 illustrates a second example of exemplary configuration of the control device according to an embodiment of the present disclosure.

FIG. 22 is a block diagram showing a second example of a schematic configuration of a base station to which the technology of the present disclosure may be applied. The gNB 1530 includes a plurality of antennas 1540, a base station device 1550, and an RRH 1560. The RRH 1560 and each antenna 1540 may be connected to each other via an RF cable. The base station device 1550 and the RRH 1560 may be connected to each other via a high speed line such as a fiber optic cable. In one implementation, the gNB 1530 (or base station device 1550) herein may correspond to the electronic device 100 described above.

The antennas 1540 includes multiple antenna elements, such as multiple antenna arrays for the large-scale MIMO. The antennas 1540, for example, may be arranged as the antenna array matrix as illustrated in FIG. 2A, and is used for the base station device 1550 to transmit and receive radio signals. For example, multiple antennas 1410 may be compatible with multiple frequency bands used by the gNB 1530.

The base station device 1550 includes a controller 1551, a memory 1552, a network interface 1553, a radio communication interface 1555, and a connection interface 1557. The controller 1551, the memory 1552, and the network interface 1553 are the same as the controller 1421, the memory 1422, and the network interface 1423 described with reference to FIG. 21.

The radio communication interface 1555 supports any cellular communication scheme (such as LTE and LTE- Advanced) and provides radio communication to terminals positioned in a sector corresponding to the RRH 1560 via the RRH 1560 and the antenna 1540. The radio communication interface 1555 may typically include, for example, a BB processor 1556. The BB processor 1556 is the same as the BB processor 1426 described with reference to FIG. 21, except that the BB processor 1556 is connected to the RF circuit 1564 of the RRH 1560 via the connection interface 1557. The radio communication interface 1555 may include the multiple BB processors 1556, as shown in FIG. 22. For example, the multiple BB processors 1556 may be compatible with multiple frequency bands used by the gNB 1530. Although FIG. 22 shows the example in which the radio communication interface 1555 includes multiple BB processors 1556, the radio communication interface 1555 may also include a single BB processor 1556.

The connection interface 1557 is an interface for connecting the base station device 1550 (radio communication interface 1555) to the RRH 1560. The connection interface 1557 may also be a communication module for communication in the above-described high speed line that connects the base station device 1550 (radio communication interface 1555) to the RRH 1560.

The RRH 1560 includes a connection interface 1561 and a radio communication interface 1563.

The connection interface 1561 is an interface for connecting the RRH 1560 (radio communication interface 1563) to the base station device 1550. The connection interface 1561 may also be a communication module for communication in the above-described high speed line.

The radio communication interface 1563 transmits and receives radio signals via the antenna 1540. Radio communication interface 1563 may typically include, for example, the RF circuitry 1564. The RF circuit 1564 may include, for example, a mixer, a filter, and an amplifier, and transmits and receives radio signals via the antenna 1540. Although FIG. 22 shows the example in which one RF circuit 1564 is connected to one antenna 1540, the present disclosure is not limited to thereto; rather, one RF circuit 1564 may connect to a plurality of antennas 1540 at the same time.

The radio communication interface 1563 may include multiple RF circuits 1564, as shown in FIG. 22. For example, multiple RF circuits 1564 may support multiple antenna elements. Although FIG. 22 shows the example in which the radio communication interface 1563 includes the multiple RF circuits 1564, the radio communication interface 1563 may also include a single RF circuit 1564.

In the gNB 1500 shown in FIG. 22, one or more units (for example, the indicating unit 103) included in the processing circuit 101 described with reference to FIG. 18A may be implemented in the wireless communication interface 1525. Alternatively, at least a part of these components may be implemented in the controller 1521. For example, the gNB 1500 includes a part (for example, the BB processor 1526) or entirety of the wireless communication interface 1525, and/or a module including the controller 1521, and one or more components may be implemented in the module. In this case, the module may store a program for allowing the processor to function as one or more components (in other words, a program for allowing the processor to perform operations of one or more components) and execute the program. As another example, a program for allowing the processor to function as one or more components may be installed in the gNB 1500, and the wireless communication interface 1525 (for example, the BB processor 1526) and/or the controller 1521 may execute the program. As described above, as an apparatus including one or more components, the gNB 1500, the base station device 1520, or a module may be provided, and a program for allowing the processor to function as one or more components may be provided. In addition, a readable medium in which the program is recorded may be provided.

First Application Example of User Equipment

Figure 23:
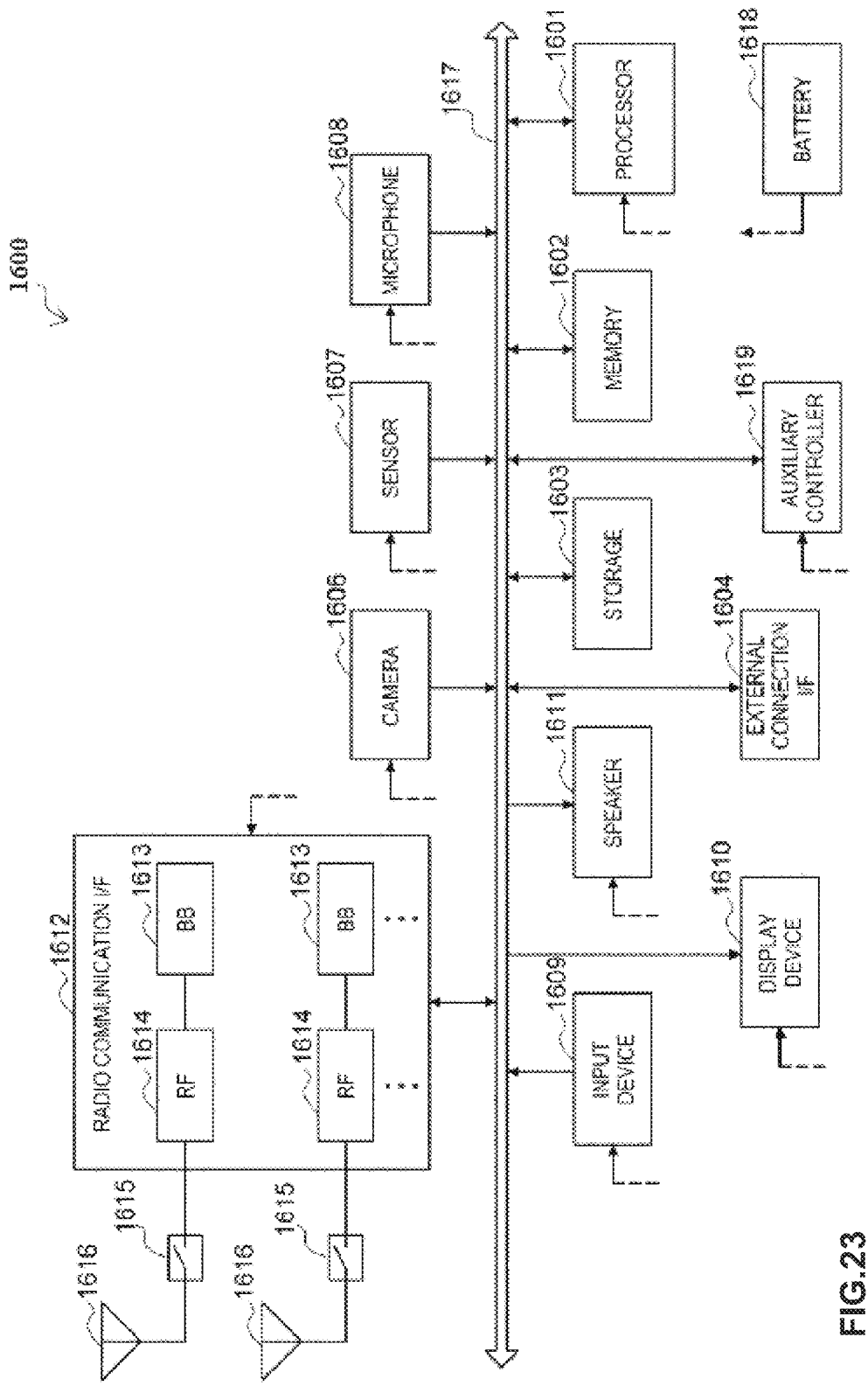
FIG. 23 illustrates an exemplary configuration of a smart phone according to an embodiment of the present disclosure.

FIG. 23 is a block diagram showing an example of a schematic configuration of a smartphone 1600 to which the technology of the present disclosure may be applied. In one example, the smart phone 1600 may be implemented as the electronic device 200 described with reference to FIG. 19A.

The smartphone 1600 includes a processor 1601, a memory 1602, a storage 1603, an external connection interface 1604, an camera 1606, a sensor 1607, a microphone 1608, an input device 1609, a display device 1610, a speaker 1611, a radio communication interface 1612, one or more antenna switch 1615, one or more antennas 1616, a bus 1617, a battery 1618, and an auxiliary controller 1619.

The processor 1601 may be, for example, a CPU or a system on chip (SoC), and controls functions of an application layer and the other layers of the smartphone 1600. The processor 1601 may include or function as the processing circuitry 201 described with reference to FIG. 19A. The memory 1602 includes RAM and ROM, and stores a program that is executed by the processor 1601, and data. The storage 1603 may include a storage medium such as a semiconductor memory and a hard disk. The external connection interface 1604 is an interface for connecting an external device such as a memory card and a universal serial bus (USB) device to the smartphone 1600.

The camera 1606 includes an image sensor such as a charge coupled device (CCD) and a complementary metal oxide semiconductor (CMOS), and generates a captured image. Sensor 1607 may include a group of sensors such as a measurement sensor, a gyro sensor, a geomagnetic sensor, and an acceleration sensor. The microphone 1608 converts the sounds that are input to the smartphone 1600 to audio signals. The input device 1609 includes, for example, a touch sensor configured to detect touch on a screen of the display device 1610, a keypad, a keyboard, a button, or a switch, and receives an operation or an information input from a user. The display device 1610 includes a screen such as a liquid crystal display (LCD) and an organic light emitting diode (OLED) display, and displays an output image of the smartphone 1600. The speaker 1611 converts audio signals that are output from the smartphone 1600 to sounds.

The radio communication interface 1612 supports any cellular communication scheme such as 4G LTE, 5G NR or the like, and performs radio communication. The radio communication interface 1612 may typically include, for example, a BB processor 1613 and an RF circuitry 1614. The BB processor 1613 may perform, for example, encoding/decoding, modulation/demodulation, and multiplexing/demultiplexing, and performs various types of signal processing for radio communication. Meanwhile, the RF circuit 1614 may include, for example, a mixer, a filter, and an amplifier, and transmits and receives radio signals via the antenna 1616. The radio communication interface 1612 may be a one-chip module that integrates the BB processor 1613 and the RF circuit 1614 thereon. The radio communication interface 1612 may include multiple BB processors 1613 and multiple RF circuits 1614, as shown in FIG. 23. Although FIG. 23 shows the example in which the radio communication interface 1612 includes multiple BB processors 1613 and multiple RF circuits 1614, the radio communication interface 1612 may also include a single BB processor 1613 or a single RF circuit 1614.

In addition, in addition to a cellular communication scheme, the radio communication interface 1612 may support additional type of radio communication schemes, such as short-range wireless communication schemes, a near field communication schemes, and a wireless local area network (LAN) scheme. In this case, the radio communication interface 1612 may include the BB processor 1613 and the RF circuitry 1614 for each radio communication scheme.

Each of the antenna switches 1615 switches connection destinations of the antenna 1616 among multiple circuits (such as circuits for different radio communication schemes) included in the radio communication interface 1612.

The antenna 1616 includes multiple antenna elements, such as multiple antenna arrays for the large-scale MIMO. The antenna 1616, for example, may be arranged as the antenna array matrix as illustrated in FIG. 2A, and is used for the wireless communication interface 1612 to transmit and receive radio signals. The smartphone 1600 may include one or more antenna panels (not shown).

In addition, the smartphone 1600 may include the antenna 1616 for each radio communication scheme. In this case, the antenna switch 1615 may be omitted from the configuration of the smartphone 1600.

The bus 1617 connects the processor 1601, the memory 1602, the storage 1603, the external connection interface 1604, the camera 1606, the sensor 1607, the microphone 1608, the input device 1609, the display device 1610, the speaker 1611, the radio communication interface 1612, and the auxiliary control 1619 to each other. The battery 1618 supplies power to blocks of the smartphone 1600 shown in FIG. 23 via feeder lines, which are partially shown as a dashed line in the figure. The auxiliary controller 1619 operates a minimum necessary function of the smartphone 1600, for example, in a sleep mode.

In the smart phone 1600 shown in FIG. 23, one or more components (for example, the receiving unit 203) included in the processing circuitry 201 described with reference to FIG. 19A may be implemented in the wireless communication interface 1612. Alternatively, at least a part of these components may be implemented in the processor 1601 or the auxiliary controller 1619. As an example, the smart phone 1600 includes a part or entirety of the wireless communication interface 1612 (for example, the BB processor 1613), and/or a module including the processor 1601 and/or the auxiliary controller 1619, and one or more components may be implemented in this module. In this case, the module may store a program that allows processing to function as one or more components (in other words, a program for allowing the processor to perform the operation of one or more components) and execute the program. As another example, a program for allowing the processor to function as one or more components may be installed in the smart phone 1600, and the wireless communication interface 1612 (for example, the BB processor 1613), the processor 1601, and/or the auxiliary controller 1619 can execute this program. As described above, as an apparatus including one or more components, a smart phone 1600 or a module may be provided, and a program for allowing a processor to function as one or more components may be provided. In addition, a readable medium in which the program is recorded may be provided.

Second Application Example of User Equipment

Figure 24:
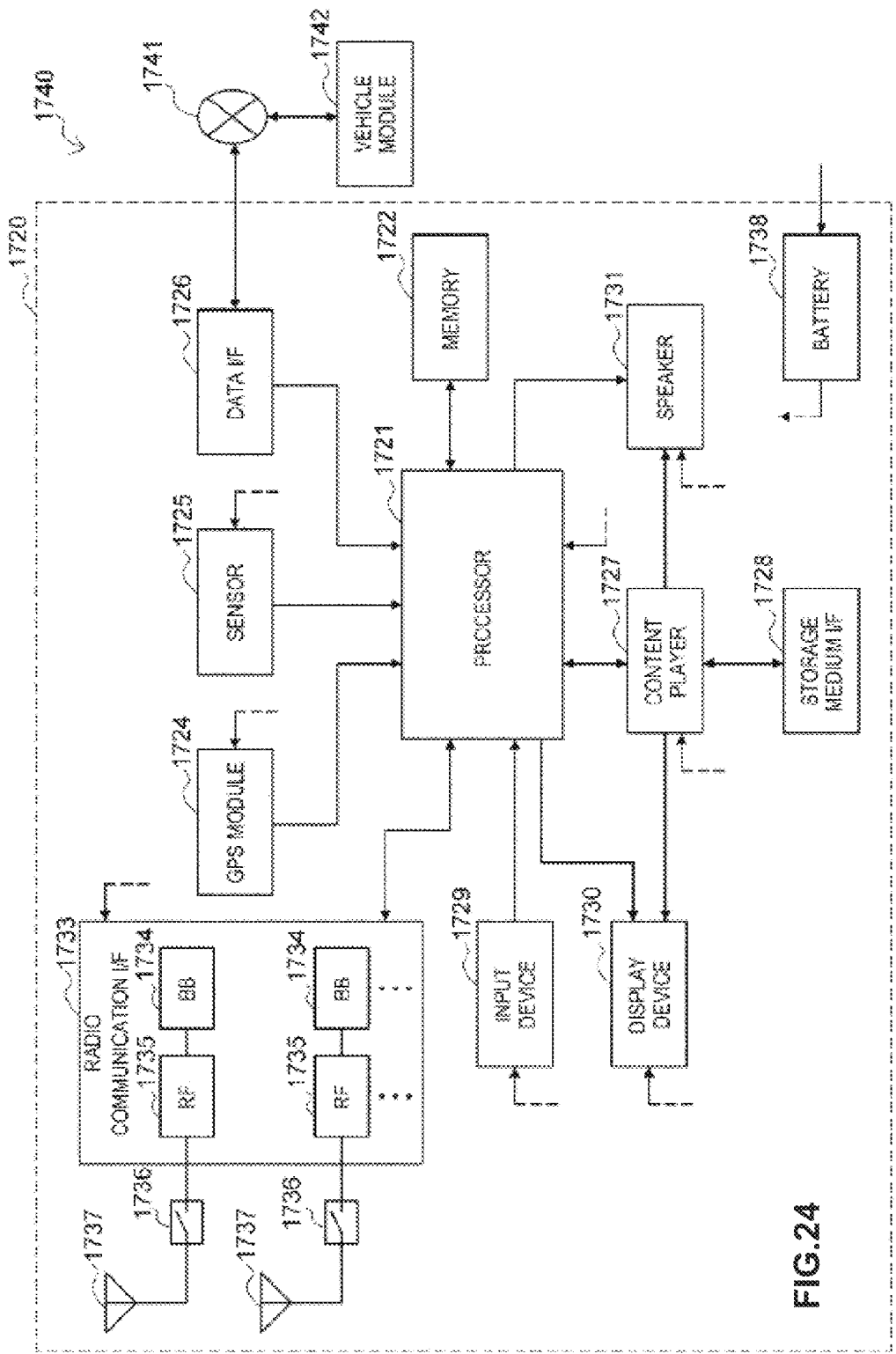
FIG. 24 illustrates an exemplary configuration of a vehicle navigation device according to an embodiment of the present disclosure.

FIG. 24 is a block diagram showing an example of a schematic configuration of a vehicle navigation device 1720 to which the technology of the present disclosure may be applied. The vehicle navigation device 1720 may be implemented as the electronic device 200 described with reference to FIG. 19A. The vehicle navigation device 1720 includes a processor 1721, a memory 1722, a global positioning system (GPS) module 1724, a sensor 1725, a data interface 1726, a content player 1727, a storage medium interface 1728, an input device 1729, a display device 1730, a speaker 1731, and a radio communication interface 1733, one or more antenna switches 1736, one or more antennas 1737, and a battery 1738.

The processor 1721 may be, for example, a CPU or a SoC, and controls a navigation function and other functions of the vehicle navigation device 1720. The memory 1722 includes RAM and ROM, and stores a program that is executed by the processor 1721, and data.

The GPS module 1724 uses GPS signals received from a GPS satellite to measure a position, such as latitude, longitude, and altitude, of the vehicle navigation device 1720. Sensor 1725 may include a group of sensors such as a gyro sensor, a geomagnetic sensor, and an air pressure sensor. The data interface 1726 is connected to, for example, an in-vehicle network 1741 via a terminal not shown, and acquires data generated by the vehicle, such as vehicle speed data.

The content player 1727 reproduces content stored in a storage medium (such as a CD and a DVD) that is inserted into the storage medium interface 1728. The input device 1729 includes, for example, a touch sensor configured to detect touch on a screen of the display device 1730, a button, or a switch, and receives an operation or an information input from a user. The display device 1730 includes a screen such as an LCD or an OLED display, and displays an image of the navigation function or content that is reproduced. The speaker 1731 outputs sounds of the navigation function or the content that is reproduced.

The radio communication interface 1733 supports any cellular communication scheme, such as 4G LTE or 5G NR, and performs radio communication. The radio communication interface 1733 may typically include, for example, a BB processor 1734 and an RF circuit 1735. The BB processor 1734 may perform, for example, encoding/decoding, modulation/demodulation, and multiplexing/demultiplexing, and performs various types of signal processing for radio communication. Meanwhile, the RF circuit 1735 may include, for example, a mixer, a filter, and an amplifier, and transmits and receives radio signals via the antenna 1737. The radio communication interface 1733 may also be a one-chip module which integrates the BB processor 1734 and the RF circuit 1735 thereon. The radio communication interface 1733 may include multiple BB processors 1734 and multiple RF circuits 1735, as shown in FIG. 24. Although FIG. 24 shows the example in which the radio communication interface 1733 includes multiple BB processors 1734 and multiple RF circuits 1735, the radio communication interface 1733 may also include a single BB processor 1734 or a single RF circuit 1735.

Furthermore, in addition to a cellular communication scheme, the radio communication interface 1733 may support another type of radio communication scheme such as a short-range wireless communication scheme, a near-field communication scheme, and a wireless LAN scheme. In this case, the radio communication interface 1733 may include the BB processor 1734 and the RF circuit 1735 for each radio communication scheme.

Each of the antenna switches 1736 switches the connection destination of the antenna 1737 among multiple circuits (such as circuits for different radio communication schemes) included in the radio communication interface 1733.

The antenna 1737 includes multiple antenna elements, such as multiple antenna arrays for the large-scale. The antenna 1737, for example, may be arranged as the antenna array matrix as illustrated in FIG. 2A, and is used for the radio communication interface 1733 to transmit and receive radio signals.

In addition, the vehicle navigation device 1720 may include the antenna 1737 for each radio communication scheme. In this case, the antenna switch 1736 may be omitted from the configuration of the vehicle navigation device 1720.

The battery 1738 supplies power to blocks of the vehicle navigation device 1720 shown in FIG. 24 via feeder lines that are partially shown as dashed lines in the figure. Battery 1738 accumulates power supplied from the vehicle.

In the vehicle navigation device 1720 shown in FIG. 24, one or more components (for example, the receiving unit 203) included in the processing circuitry 201 described with reference to FIG. 19A may be implemented in the wireless communication interface 1733. Alternatively, at least a part of these components may be implemented in the processor 1721. As an example, the vehicle navigation device 1720 includes a part (for example, the BB processor 1734) or entirety of the wireless communication interface 1733, and/or a module including the processor 1721, and one or more components may be implemented in the module. In this case, the module may store a program that allows processing to function as one or more components (in other words, a program for allowing the processor to perform the operation of one or more components) and execute the program. As another example, a program for allowing the processor to function as one or more components may be installed in the vehicle navigation device 1720, and the wireless communication interface 1733 (for example, the BB processor 1734) and/or the processor 1721 may Execute the procedure. As described above, as an apparatus including one or more components, a vehicle navigation device 1720 or a module may be provided, and a program for allowing the processor to function as one or more components may be provided. In addition, a readable medium in which the program is recorded may be provided.

In addition, in the vehicle navigation device 1720 shown in FIG. 24, for example, the communication unit 205 described with reference to FIG. 19A may be implemented in the wireless communication interface 1933 (for example, the RF circuit 1935).

The technology of the present disclosure may also be realized as an in-vehicle system (or vehicle) 1740 including one or more blocks of the vehicle navigation device 1720, the in-vehicle network 1741, and the vehicle module 1742. The vehicle module 1742 generates vehicle data such as vehicle speed, engine speed, and faults information, and outputs the generated data to the in-vehicle network 1741.

The exemplary embodiments of the present disclosure have been described above with reference to the accompanying drawings, but the present disclosure is of course not limited to the above examples. Those skilled in the art can made various changes and modifications within the scope of the appended claims, and it should be understood that these changes and modifications will naturally fall within the technical scope of the present disclosure.

For example, in the above embodiments, the multiple functions included in one module may be implemented by separate means. Alternatively, in the above embodiments, the multiple functions included in multiple modules may be implemented by separate means, respectively. In additions, one of the above functions may be implemented by multiple modules. Needless to say, such configurations are included in the the scope of the technology of the present disclosure.

In this specification, the steps described in the flowcharts include not only the processes performed sequentially in chronological order, but also the processes performed in parallel or separately but not necessarily performed in chronological order. Furthermore, even in the steps performed in chronological order, needless to say, the order may be changed appropriately.

Although the present disclosure and its advantages have been described in detail, it will be appreciated that various changes, replacements and transformations may be made without departing from the spirit and scope of the present disclosure as defined by the appended claims. In addition, the terms "include", "comprise" or any other variants of the embodiments of the present disclosure are intended to be non-exclusive inclusion, such that the process, method, article or device including a series of elements includes not only these elements, but also those that are not listed specifically, or those that are inherent to the process, method, article or device. In case of further limitations, the element defined by the sentence "include one" does not exclude the presence of additional same elements in the process, method, article or device including this element.

What is claimed is:

1. An electronic device configured as a base station and comprising:
   processing circuitry configured to:
      receive a beam report received from a user equipment,
      select, based on the beam report received from the user equipment, a plurality of transmitting beams to be used for downlink transmission with a user equipment from a set of transmitting beams; and
      control to send, to the user equipment, Downlink Control Information (DCI) that indicates a plurality of transmission configuration indication (TCI) state IDs that are encoded into a single TCI field,
      wherein the plurality of TCI state IDs that are encoded into the single TCI field indicates the plurality of transmitting beams that has been selected by the electronic device configured as the base station from the set of transmitting beam.

2. The electronic device of claim 1, wherein the plurality of TCI state IDs that are encoded into the single TCI field indicates the plurality of transmitting beams by way of indices.

3. The electronic device of claim 1, wherein the plurality of transmitting beams are for PDSCH transmission, and the processing circuitry is further configured to configure a first set of TCI states to the UE with a RRC layer signaling, activate a second set of TCI states from the first set of TCI states with a MAC CE to the UE, and designate the plurality of transmitting beams for PDSCH transmission with the single TCI field in DCI to the UE.

4. The electronic device of claim 1, wherein the single TCI field comprises at least 3 bits that forms a binary value that indicates the plurality of TCI state IDs that has been selected by the electronic device configured as the base station from the set of transmitting beams.

5. An electronic device configured as a user equipment and comprising:
   processing circuitry configured to:
      measure beam information of a set of transmitting beams,
      transmit a beam report related to the measured beam information to a base station, and receive, from the base station, Downlink Control Information (DCI) that indicates a plurality of transmission configuration indication (TCI) state IDs that are encoded into a single TCI field, wherein the plurality of TCI state IDs that are encoded into the single TCI field indicates the plurality of transmitting beams that has been selected by the base station from the set of transmitting beams.

6. The electronic device of claim 5, wherein the plurality of TCI state IDs that are encoded into the single TCI field indicates the plurality of transmitting beams by way of indices.

7. The electronic device of claim 5, wherein the plurality of transmitting beams is for PDSCH transmission, and the processing circuitry is further configured to receive configuration information on a first set of TCI states based on a RRC layer signaling from the base station, activate a second set of TCI states from the first set of TCI states based on a MAC CE from the base station, and determine the plurality of transmitting beams for PDSCH transmission indicated in the single TCI field in DCI.

8. The electronic device of claim 5, wherein the single TCI field comprises at least 3 bits that forms a binary value that indicates the plurality of TCI state IDs that has been selected by the electronic device configured as the base station from the set of transmitting beams.

9. A method of communication performed by an electronic device configured as a base station, the method comprising:

receiving a beam report received from the user equipment;

selecting, based on the beam report received from the user equipment, a plurality of transmitting beams to be used for downlink transmission with a user equipment from a set of transmitting beams; and sending, to the user equipment, Downlink Control Information (DCI) that indicates a plurality of transmission configuration indication (TCI) state IDs that are encoded into a single TCI field, wherein the plurality of TCI state IDs that are encoded into the single TCI field indicates the plurality of transmitting beams that has been selected by the electronic device configured as the base station from the set of transmitting beams.

10. The method of claim 9, wherein the plurality of transmitting beams are for PDSCH transmission, and the method further comprises:

configuring a first set of TCI states to the UE with a RRC layer signaling;

activating a second set of TCI states from the first set of TCI states with a MAC CE, to the UE; and designating the plurality of transmitting beams for PDSCH transmission with the single TCI field in DCI to the UE.

11. The method of claim 9, wherein the single TCI field comprises at least 3 bits that forms a binary value that indicates the plurality of TCI state IDs that has been selected by the electronic device configured as the base station from the set of transmitting beams.

12. A method of communication performed by an electronic device configured as a user equipment, the method comprising:

measuring beam information of a set of transmitting beams;

transmitting a beam report related to the measured beam information to a base station; and receiving, from the base station, Downlink Control Information (DCI) that indicates a plurality of transmission configuration indication (ICI) state IDs that are encoded into a single TCI field, wherein the plurality of TCI state IDs that are encoded into the single TCI field indicates the plurality of transmitting beams that has been selected by the base station from the set of transmitting beams.

13. The method of claim 12, wherein the plurality of transmitting beams is for PDSCH transmission, and the method further comprises:

receiving configuration information on a first set of TCI states based on a RRC layer signaling from the base station;

activating a second set of TCI states from the first set of TO states based on a MAC CE from the base station; and determining the plurality of transmitting beams for PDSCH transmission indicated in the single TCI field in DCI.

14. The method of claim 12, wherein the single TCI field comprises at least 3 bits that forms a binary value that indicates the plurality of TCI state IDs that has been selected by the electronic device configured as the base station from the set of transmitting beams.

* * * * *